(12) United States Patent
Gao et al.

(10) Patent No.: US 12,671,474 B2
(45) Date of Patent: Jun. 30, 2026

(54) CSI ENHANCEMENTS FOR URLLC

(71) Applicant: Telefonaktiebolaget LM Ericsson (publ), Stockholm (SE)

(72) Inventors: Shiwei Gao, Nepean (CA); Siva Muruganathan, Stittsville (CA); Jonas Fröberg Olsson, Ljungsbro (SE); Yufei Blankenship, Kildeer, IL (US); Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 18/031,235

(22) PCT Filed: Oct. 12, 2021

(86) PCT No.: PCT/IB2021/059362
§ 371 (c)(1),
(2) Date: Apr. 11, 2023

(87) PCT Pub. No.: WO2022/079605
PCT Pub. Date: Apr. 21, 2022

(65) Prior Publication Data
US 2023/0379025 A1    Nov. 23, 2023

(30) Foreign Application Priority Data
Oct. 12, 2020    (WO) ............... PCT/CN2020/120293

(51) Int. Cl.
| | |
|---|---|
| *H04B 7/06* | (2006.01) |
| *H04B 17/345* | (2015.01) |
| *H04L 5/00* | (2006.01) |

(52) U.S. Cl.
CPC ......... *H04B 7/0626* (2013.01); *H04B 17/345* (2015.01); *H04L 5/001* (2013.01); *H04L 5/0048* (2013.01)

(58) Field of Classification Search
CPC ..... H04B 7/0626; H04B 17/345; H04L 5/001; H04L 5/0048; H04L 5/0051; H04L 5/0053; H04W 72/21; H04W 72/541
See application file for complete search history.

(56) References Cited

U.S. PATENT DOCUMENTS

| | | | |
|---|---|---|---|
| 10,412,593 | B2 | 9/2019 | Noh et al. |
| 2016/0157118 | A1* | 6/2016 | Liu ...................... H04L 1/0003 370/252 |

(Continued)

FOREIGN PATENT DOCUMENTS

WO          2020091496 A1      5/2020

OTHER PUBLICATIONS

Author Unknown, "Technical Specification Group Radio Access Network; NR; Physical channels and modulation (Release 16)," Technical Specification 38.211, Version 16.3.0, Sep. 2020, 3GPP Organizational Partners, 133 pages.

(Continued)

*Primary Examiner* — Atique Ahmed
(74) *Attorney, Agent, or Firm* — Withrow & Terranova, PLLC

(57)          ABSTRACT

Systems and methods for Channel State Information (CSI) enhancements are provided. In some embodiments, a method performed by a wireless device for reporting channel conditions includes one or more of: receiving a Channel State Information-Interference Measurement (CSI-IM) pattern; and reporting channel conditions based on the CSI-IM pattern. In some embodiments, the CSI-IM pattern spans multiple Orthogonal Frequency-Division Multiplexing (OFDM) symbols on a single subcarrier in a slot. In this way, these CSI-IM patterns might allow better interference measurement by capturing interference in all OFDM symbols in a slot and thus more accurate interference estimation and CSI feedback. The enhanced aperiodic CSI might allow (Continued)

interference variations over time to be measured and reported so that proper margins can be applied by the base station in downlink scheduling to ensure reliable data delivery while maintaining high spectrum efficiency.

14 Claims, 23 Drawing Sheets

(56) References Cited

U.S. PATENT DOCUMENTS

| | | | | |
|---|---|---|---|---|
| 2017/0063503 | A1* | 3/2017 | Liu | H04L 1/0003 |
| 2017/0223716 | A1 | 8/2017 | Li et al. | |
| 2018/0287682 | A1* | 10/2018 | Kwak | H04B 7/0695 |
| 2019/0116583 | A1* | 4/2019 | Sahlin | H04L 5/0094 |
| 2019/0373614 | A1* | 12/2019 | Yum | H04W 72/53 |
| 2021/0203464 | A1* | 7/2021 | Ren | H04L 5/0062 |
| 2021/0242988 | A1* | 8/2021 | Kwak | H04L 5/0048 |
| 2021/0258059 | A1* | 8/2021 | Onggosanusi | H04L 5/0094 |
| 2021/0400677 | A1* | 12/2021 | Lee | H04L 5/005 |
| 2022/0159596 | A1* | 5/2022 | Kim | H04J 11/00 |
| 2023/0189020 | A1* | 6/2023 | Calcev | H04W 72/21 |
| | | | | 370/329 |
| 2023/0319605 | A1* | 10/2023 | Park | H04L 5/00 |
| | | | | 370/252 |

OTHER PUBLICATIONS

Author Unknown, "Technical Specification Group Radio Access Network; NR; Multiplexing and channel coding (Release 16)," Technical Specification 38.212, Version 16.3.0, Sep. 2020, 3GPP Organizational Partners, 152 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

International Search Report and Written Opinion for International Patent Application No. PCT/IB2021/059362, mailed Jan. 27, 2022, 13 pages.

* cited by examiner

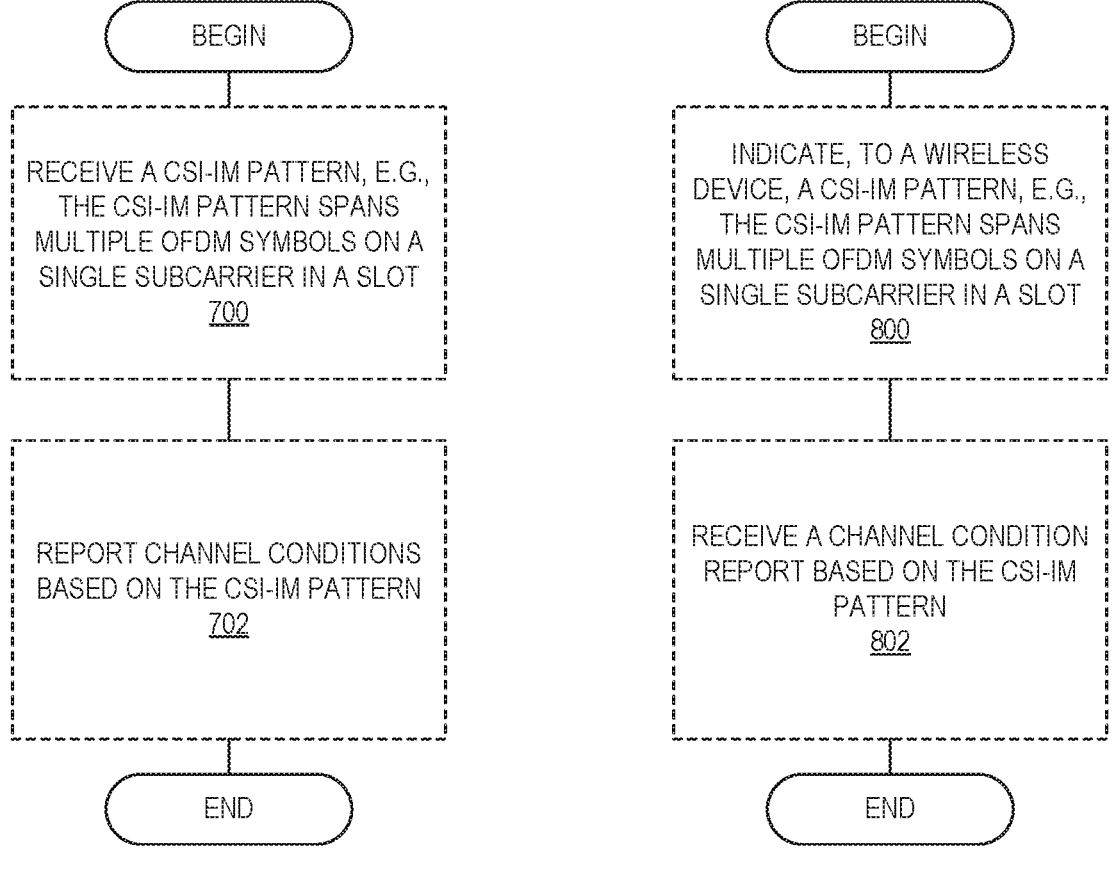
FIG. 7                                FIG. 8

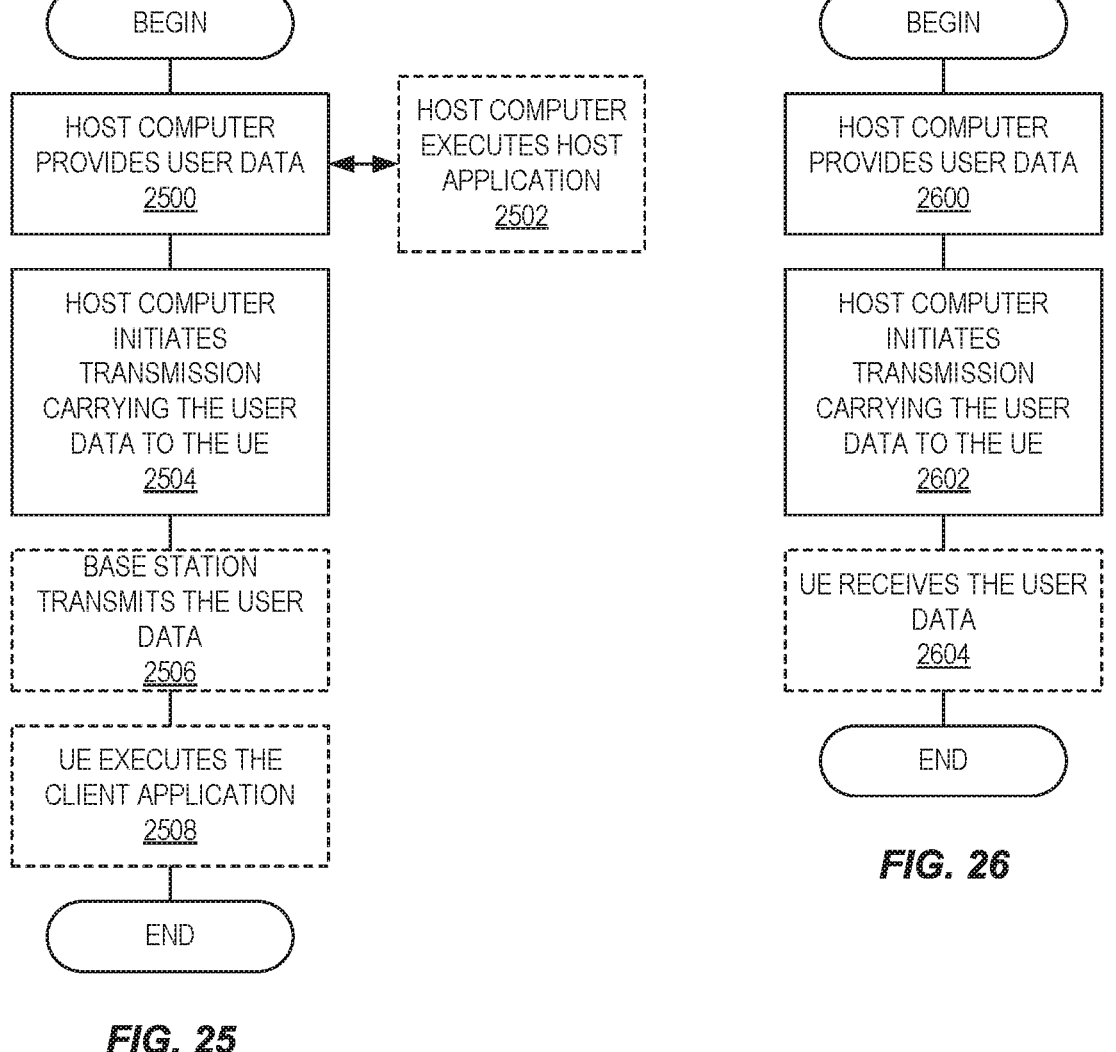

BEGIN

HOST COMPUTER PROVIDES USER DATA
2500

HOST COMPUTER EXECUTES HOST APPLICATION
2502

HOST COMPUTER INITIATES TRANSMISSION CARRYING THE USER DATA TO THE UE
2504

BASE STATION TRANSMITS THE USER DATA
2506

UE EXECUTES THE CLIENT APPLICATION
2508

END

FIG. 25

BEGIN

HOST COMPUTER PROVIDES USER DATA
2600

HOST COMPUTER INITIATES TRANSMISSION CARRYING THE USER DATA TO THE UE
2602

UE RECEIVES THE USER DATA
2604

END

FIG. 26

CSI ENHANCEMENTS FOR URLLC

RELATED APPLICATIONS

This application is a 35 U.S.C. § 371 national phase filing of International Application No. PCT/IB2021/059362, filed Oct. 12, 2021, which claims the benefit of International Application No. PCT/CN2020/120293, filed Oct. 12, 2020, the disclosures of which are hereby incorporated herein by reference in their entireties.

TECHNICAL FIELD

The present disclosure relates to reporting Channel State Information (CSI).

BACKGROUND

The next generation mobile wireless communication system (5G) or new radio (NR) will support a diverse set of use cases and a diverse set of deployment scenarios. The later includes deployment at both low frequencies (100s of MHz), similar to LTE today, and very high frequencies (mm waves in the tens of GHz).

Similar to LTE, NR will use OFDM (Orthogonal Frequency Division Multiplexing) in the downlink (i.e. from a network node, gNB, eNB, or base station, to a user equipment or UE). In the uplink (i.e. from UE to gNB), both OFDM and Discrete Fourier Ttransform-spread OFDM (DFT-S-OFDM), also known as SC-FDMA in LTE, will be supported. The basic NR physical resource can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta_f=(15\times2^\mu)$ kHz where $\mu$ is a non-negative integer and can be one of $\{0, 1, 2, 3, 4\}$. $\Delta_f=15$ kHz (e.g., $\alpha=0$) is the basic (or reference) subcarrier spacing that is also used in LTE. $\mu$ is also referred to as the numerology.

In the time domain, downlink and uplink transmissions in NR will be organized into equally-sized subframes of 1 ms each similar to LTE. A subframe is further divided into multiple slots of equal duration. The slot length is dependent on the subcarrier spacing or numerology and is given by $1/2^\mu$ ms. Each slot consists of 14 OFDM symbols for normal Cyclic Prefix (CP).

It is understood that, data scheduling in NR can be in slot basis. An example is shown in FIG. 2 with a 14-symbol slot, where the first two symbols contain control channel (PDCCH) and the rest contains data channel (PDSCH). For convenience, subframe is referred throughout the following sections.

Downlink transmissions can be dynamically scheduled, i.e., in each slot the gNB transmits downlink control information (DCI) about which UE data is to be transmitted to and which resource blocks in the current downlink slot the data is transmitted on. This control signaling is typically transmitted in the first one or two OFDM symbols in each slot in NR. The control information is carried on Physical Control Channel (PDCCH) and data is carried on Physical Downlink Shared Channel (PDSCH). A UE first detects and decodes PDCCH and if a PDCCH is decoded successfully, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over the Physical Uplink Shared Channel (PUSCH) based the decoded control information in the uplink grant such as modulation order, coding rate, uplink resource allocation, and etc.

Channel State Information (CSI) and CSI Feedback: A core component in LTE and NR is the support of Multiple Input Multiple Output (MIMO) antenna deployments and MIMO related techniques. Spatial multiplexing is one of the MIMO techniques used to achieve high data rates in favorable channel conditions.

For an antenna array with $N_T$ antenna ports at the gNB for transmitting r DL symbols $s=[s_1, s_2, \ldots, s_r]^T$, the received signal at a UE with NR receive antennas at a certain RE n can be expressed as $$y_n=H_nWs+e_n$$

where $y_n$ is a $N_R\times1$ received signal vector; $H_n$ a $N_R\times N_T$ channel matrix at the RE between the gNB and the UE; W is an $N_T\times r$ precoder matrix; $e_n$ is a $N_R\times1$ noise plus interference vector received at the RE by the UE. The precoder W can be a wideband precoder, i.e., constant over a whole bandwidth part (BWP), or a subband precoder, i.e. constant over each subband.

The precoder matrix is typically selected from a codebook of possible precoder matrices, and typically indicated by means of a precoder matrix indicator (PMI), which specifies a unique precoder matrix in the codebook for a given number of symbol streams. The r symbols in s each corresponds to a spatial layer and r is referred to as the transmission rank.

The transmission rank is also dependent on the Signal to noise plus interference ratio (SINR) observed at the UE. Typically, a higher SINR is required for transmissions with higher ranks. For efficient performance, it is important that a transmission rank that matches the channel properties as well as the interference observed at a UE. For a given block error rate, the modulation level and coding scheme (MCS) is determined by the SINR, or channel quality. The precoding matrix, the transmission rank, and the channel quality are part of channel state information (CSI), which is typically measured by a UE and fed back to a network node or gNB.

Like in LTE, NR has adopted an implicit CSI mechanism where a UE feeds back the downlink CSI as one or more of a transmission rank indicator (RI), a precoder matrix indicator (PMI), and one or two channel quality indicator(s) (CQI). NR supports transmission of either one or two transport blocks (TBs) to a UE in a slot, depending on the rank. One TB is used for ranks 1 to 4, and two TBs are used for ranks 5 to 8. A CQI is associated to each TB. The CQI/RI/PMI report can be either wideband or subband based on configuration.

Channel State Information Reference Signal (CSI-RS) and CSI-IM: Similar to LTE, CSI-RS was introduced in NR for channel estimations in the downlink. A CSI-RS is transmitted on each transmit antenna port and is used by a UE to measure downlink channel associated with each of antenna ports. Up to 32 CSI reference signals are defined. The antenna ports are also referred to as CSI-RS ports. The supported number of antenna ports in NR are $\{1,2,4,8,12, 16,24,32\}$. By measuring the received CSI-RS, a UE can estimate the channel the CSI-RS is traversing, including the radio propagation channel and antenna gains. CSI-RS for this purpose is also referred to as Non-Zero Power (NZP) CSI-RS.

NZP CSI-RS can be configured to be transmitted in certain REs per PRB. FIG. 3 shows an example of a NZP CSI-RS resource configuration with 4 CSI-RS ports in a PRB in one slot.

In addition to NZP CSI-RS, Zero Power (ZP) CSI-RS was introduced in NR. The purpose is to indicate to a UE that the associated REs are muted at the gNB. If the ZP CSI-RS is allocated to be fully overlapping with NZP CSI-RS in an adjacent cell, it can be used to improve channel estimation by UEs in the adjacent cell since there is no interference created by this cell.

CSI resource for interference measurement, CSI-IM, is used in NR for a UE to measure noise and interference, typically from other cells. CSI-IM comprises of 4 REs in a slot. In NR, two different CSI-IM patterns are possible: The CSI-IM pattern can be either 4 consecutive REs in one OFDM symbol or two consecutive REs in both frequency and time domains. An example is shown in FIG. 3. Typically, gNB does not transmit any signal in the CSI-IM resource so that what observed in the resource is noise and interference from other cells.

By measuring both the channel based on a NZP CSI-RS resource and interference based on a CSI-IM resource, a UE can estimate the CSI, i.e. RI, PMI, and CQI(s).

CSI framework in NR: In NR, a UE can be configured with one or multiple CSI report configurations. Each CSI report configuration is associated with a BWP and contains all the necessary information required for a CSI report, including a CSI resource configuration for channel measurement
a CSI-IM resource configuration for interference measurement
reporting type, i.e., aperiodic CSI (on PUSCH), periodic CSI (on PUCCH) or semi-persistent CSI (on PUCCH, and DCI activated on PUSCH).
report quantity specifying what to be reported, such as RI, PMI, CQI
codebook configuration such as type I or type II CSI
frequency domain configuration, i.e., subband vs. wideband CQI or PMI, and subband size
CQI table to be used A UE can be configured with one or multiple CSI resource configurations for channel measurement and one or more CSI-IM resources for interference measurement. Each CSI resource configuration for channel measurement can contain one or more NZP CSI-RS resource sets. For each NZP CSI-RS resource set, it can further contain one or more NZP CSI-RS resources. A NZP CSI-RS resource can be periodic, semi-persistent, or aperiodic.

Similarly, each CSI-IM resource configuration for interference measurement can contain one or more CSI-IM resource sets. For each CSI-IM resource set, it can further contain one or more CSI-IM resources. A CSI-IM resource can be periodic, semi-persistent, or aperiodic.

Periodic CSI starts after it has been configured by RRC and is reported on PUCCH, the associated NZP CSI-RS resource(s) and CSI-IM resource(s) are also periodic.

For semi-persistent CSI, it can be either on PUCCH or PUSCH. Semi-persistent CSI on PUCCH is activated or deactivated by a MAC CE command. Semi-persistent CSI on PUSCH is activated or deactivated by DCI. The associated NZP CSI-RS resource(s) and CSI-IM resource(s) can be either periodic or semi-persistent.

For aperiodic CSI, it is reported on PUSCH and is activated by a CSI request bit field in DCI. The associated NZP CSI-RS resource(s) and CSI-IM resource(s) can be either periodic, semi-persistent, or aperiodic. The linkage between a code point of the CSI request field and a CSI report configuration is via an aperiodic CSI trigger state. A UE is configured by higher layer a list of aperiodic CSI trigger states, where each of the trigger states contains an associated CSI report configuration. The CSI request field is used to indicate one of the aperiodic CSI trigger states and thus, one CSI report configuration.

If there are more than one NZP CSI-RS resource set and/or more than one CSI-IM resource set are associated with a CSI report configuration, only one NZP CSI-RS resource set and one CSI-IM resource set are selected in the aperiodic CSI trigger state. Thus, each aperiodic CSI report is based on a single NZP CSI-RS resource set and a single CSI-IM resource set.

In most of the scenarios, a NZP CSI-RS resource set contains only one NZP CSI-RS resource and a CSI-IM resource set contains a single CSI-IM resource. In some multi-beam scenarios where gNB has multiple DL beams and wants to know the best beam plus the associated CSI for a UE, multiple NZP CSI-RS resources, each associated with a beam, may be configured in a NZP CSI-RS resource set. The UE would select one NZP CSI-RS resource associated with the best beam and report a CSI associated with NZP CSI-RS resource. A CRI (CSI-RS resource indicator) would be reported as part of the CSI. In this case, the same number of CSI-IM resources, each paired with a NZP CSI-RS resource need to be configured in the associated CSI-IM resource set. That is, when a UE reports a CRI value k, this corresponds to the $(k+1)^{th}$ entry of the NZP CSI-RS resource set for channel measurement, and, if configured, the $(k+1)^{th}$ entry of the CSI-IM resource set for interference measurement (clause 5.2.1.4.2 of 3GPP TS 38.214).

FIG. 4 shows an example of aperiodic CSI reporting based on an aperiodic NZP CSI-RS resource for channel measurement and a CSI-IM resource for interference measurement. The CSI is computed based on the aperiodic NZP-CSI-RS and CSI-IM triggered after the DCI. FIG. 5 is an example of aperiodic CSI reporting based on a periodic or semi-persistent NZP CSI-RS resource and a periodic or semi-persistent CSI-IM resource. In this case, the CSI is computed based on the channel and interference measurements done before the DCI triggering the CSI request.

In traditional enhanced Mobile Broadband (eMBB) application, CQI is reported aiming for a PDSCH BLER of around 10%. In case of a PDSCH decoding error, the data can be re-transmitted. In Ultra reliable and Low Latency Communication (URLLC), a Block Error Rate (BLER) of $10^{-4}$ is typically required. Retransmission is not an option for some applications with very low latency requirements. Scheduling with a large MCS margin is costly. In these applications, more accurate CQI feedback is desirable. CQI inaccuracy can be due to a number of factors. One is channel and/or interference measurement error; another is channel and interference variation over time where the channel and/or interference may be different between the time they were measured and the time a PDSCH is scheduled.

In the existing NR CSI reporting, a CSI-IM resource occupies either one or two OFDM symbols. The interference measured in a CSI-IM resource may not capture all interference from other cells if PDSCHs scheduled in other cells are not in the same OFDM symbols as the CSI-IM. Even if all PDSCHs in other cells are time overlapping with the CSI-IM, since the scheduled UEs in other cells could change from one slot to another, the measured interference in one slot is not necessarily the same as the one in a slot where a PDSCH is scheduled based on the reported CQI. Therefore, how to provide more accurate CSI feedback or more feedback information to meet low BLER requirement while maximizing the spectrum efficiency is a problem.

SUMMARY

Systems and methods for Channel State Information (CSI) enhancements are provided. In some embodiments, a method performed by a wireless device for reporting channel conditions includes one or more of: receiving a Channel State Information-Interference Measurement (CSI-IM) pattern; and reporting channel conditions based on the CSI-IM pattern. In some embodiments, the CSI-IM pattern spans multiple Orthogonal Frequency-Division Multiplexing (OFDM) symbols on a single subcarrier in a slot. In this way, these CSI-IM patterns might allow better interference measurement by capturing interference in all OFDM symbols in a slot and thus more accurate interference estimation and CSI feedback. The enhanced aperiodic CSI might allow interference variations over time to be measured and reported so that proper margins can be applied by the base station in downlink scheduling to ensure reliable data delivery while maintaining high spectrum efficiency.

A number of new CSI-IM resource patterns have been proposed for improving interference measurement. The new CSI-IM patterns span multiple OFDM symbols in a slot over a single subcarrier of each PRB.

A CSI-IM pattern with REs in every OFDM symbols of a slot

A CSI-IM pattern with REs in a subset of OFDM symbols in a slot

A CSI-IM pattern with configurable starting symbols and/or duration

A CSI-IM in every K>1 symbols in a slot

Different CSI-IM patterns in different PRBs

Rules for handling collisions with other signals or channels

An enhanced aperiodic CSI is proposed in which a CSI-IM is repeated in multiple slots for measuring and reporting CQI variations due to interference variation. The CQI variations reported can be one or more of a mean, a standard deviation, a variance, a minimum, and a percentile value of CQIs.

The new CSI-IM patterns allow better interference measurement by capturing interference in all OFDM symbols in a slot and thus more accurate interference estimation and CSI feedback.

The enhanced aperiodic CSI allows interference variations over time to be measured and reported so that proper margins can be applied by gNB in downlink scheduling to ensure reliable data delivery while maintaining high spectrum efficiency.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates a method performed by a wireless device for reporting channel conditions, according to some other embodiments of the present disclosure;

FIG. 8 illustrates a method performed by a base station for receiving channel state information, according to some other embodiments of the present disclosure;

FIG. 25 is a flowchart illustrating a method implemented in a communication system in accordance with one embodiment of the present disclosure;

FIG. 26 is a flowchart illustrating a method implemented in a communication system in accordance with one embodiment of the present disclosure;

DETAILED DESCRIPTION

Figure 1:
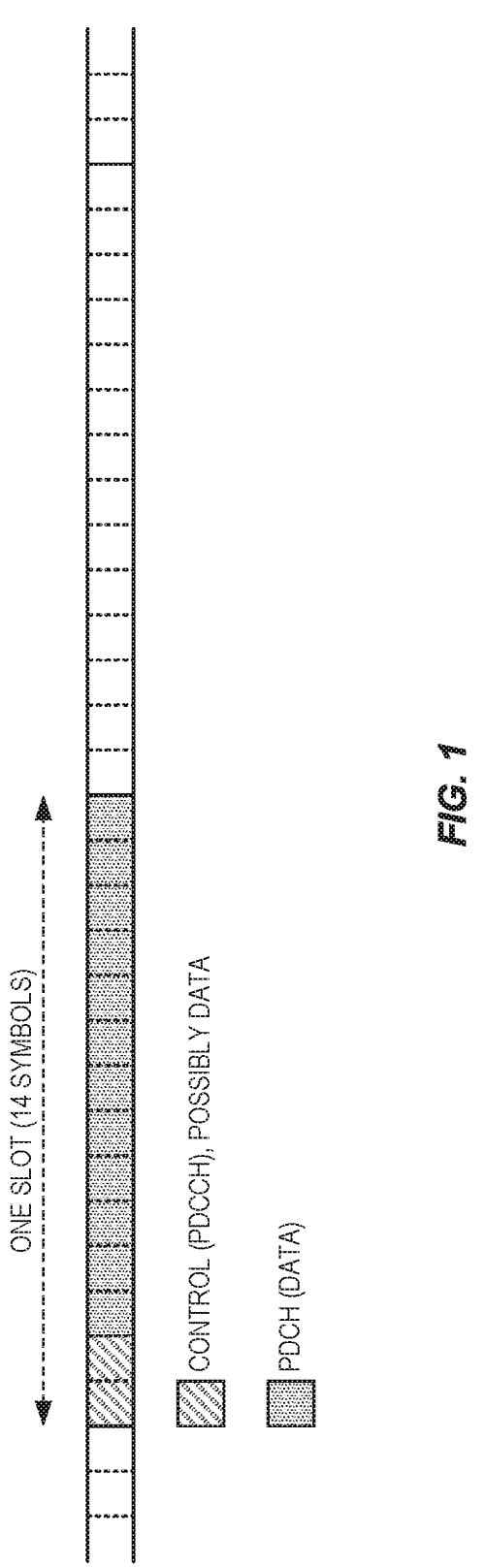
FIG. 1 illustrates data scheduling in NR in a slot basis.
Figure 2:
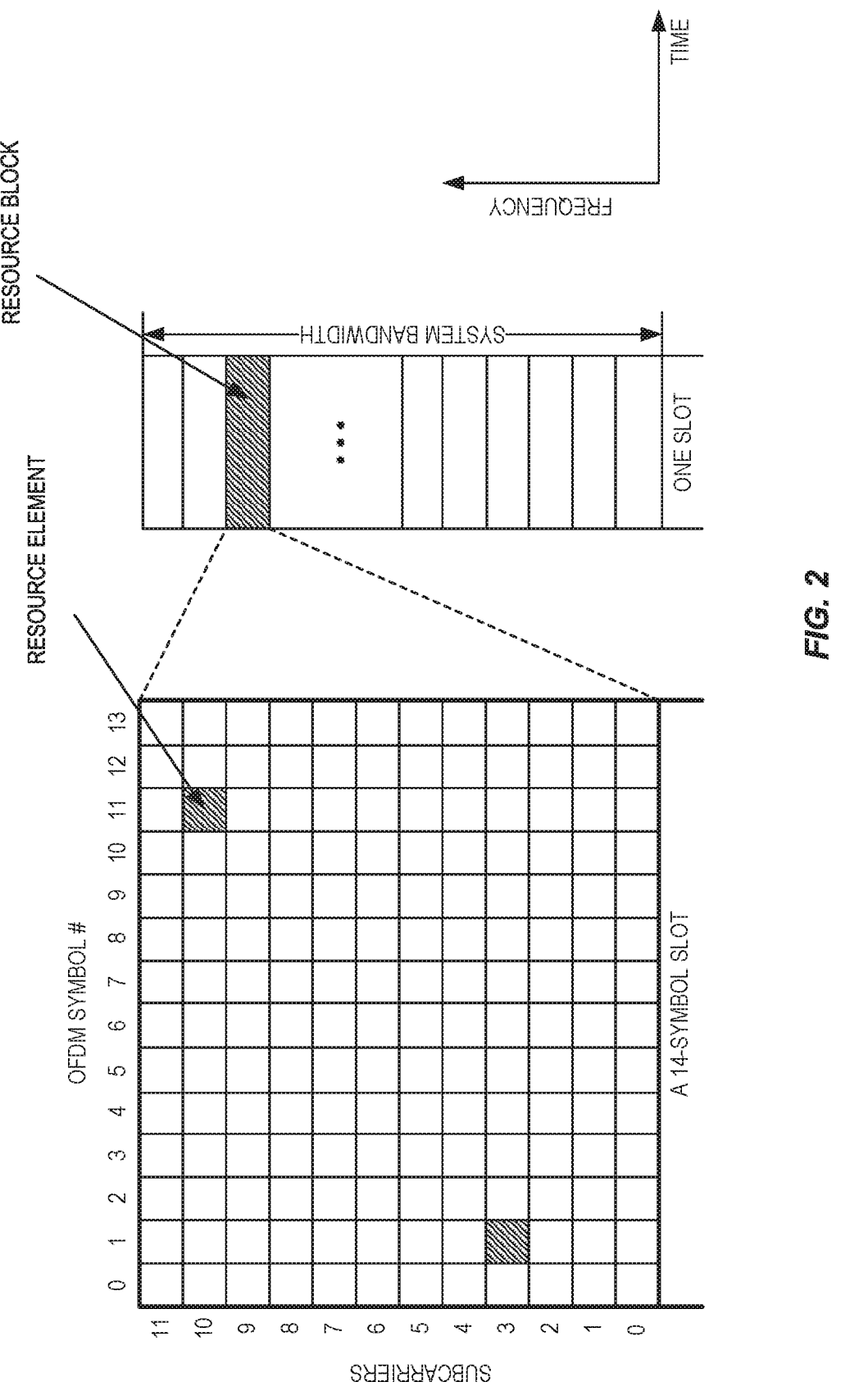
FIG. 2 illustrates the basic NR physical time-frequency resource grid.
Figure 3:
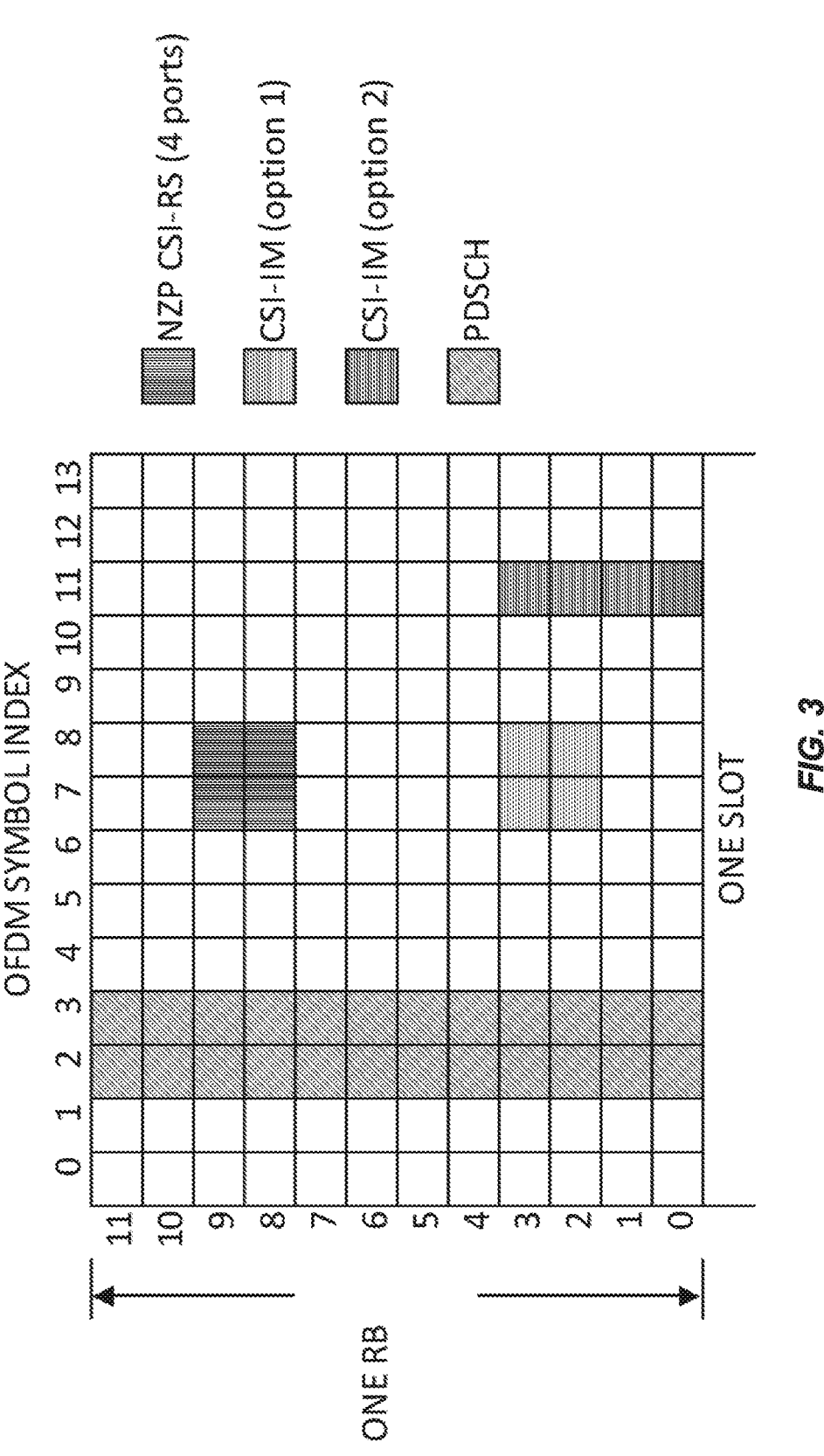
FIG. 3 shows an example of a NZP CSI-RS resource configuration with 4 CSI-RS ports in a PRB in one slot.
Figure 4:
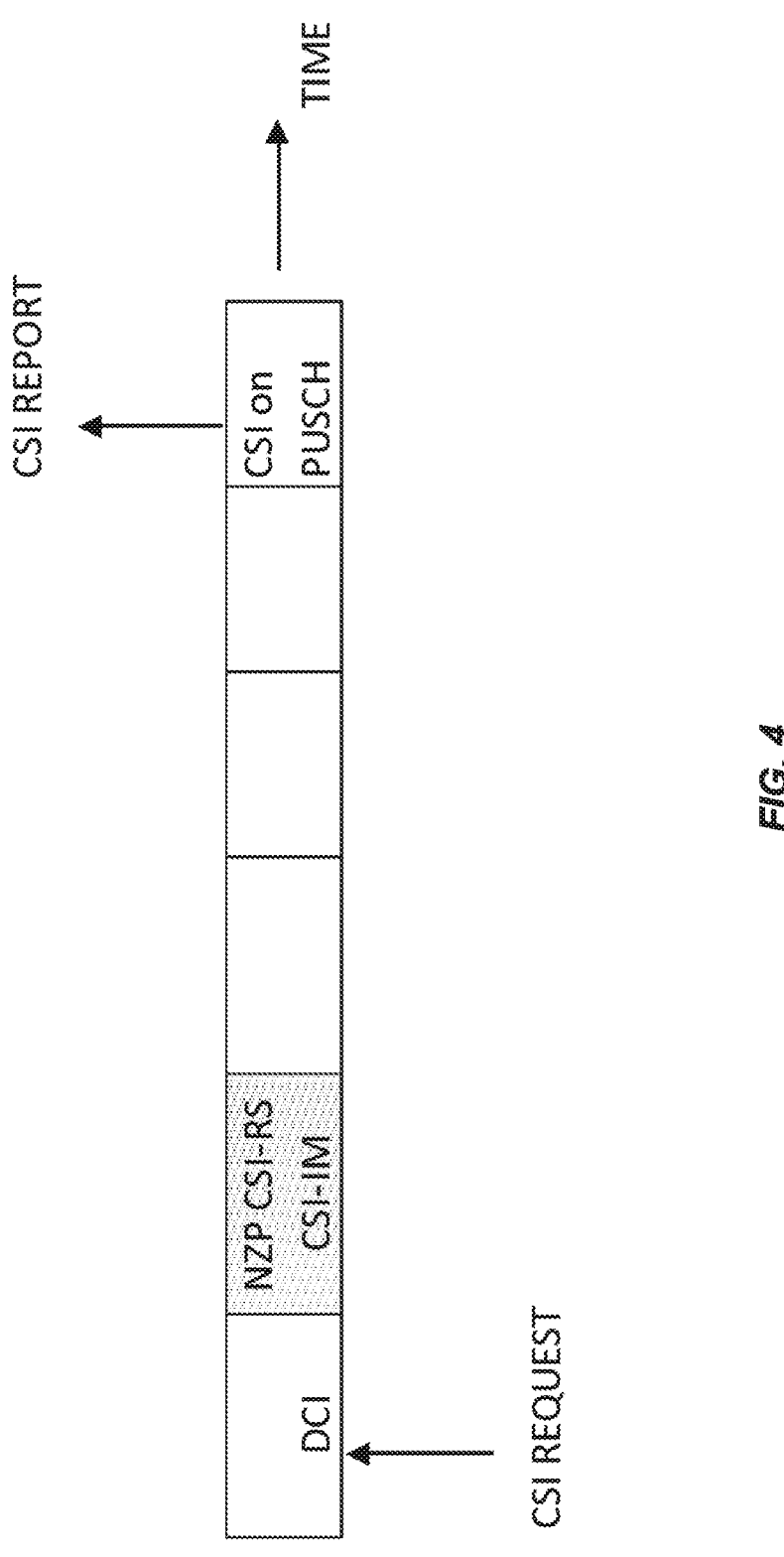
FIG. 4 shows an example of aperiodic CSI reporting based on an aperiodic NZP CSI-RS resource for channel measurement and a CSI-IM resource for interference measurement.
Figure 5:
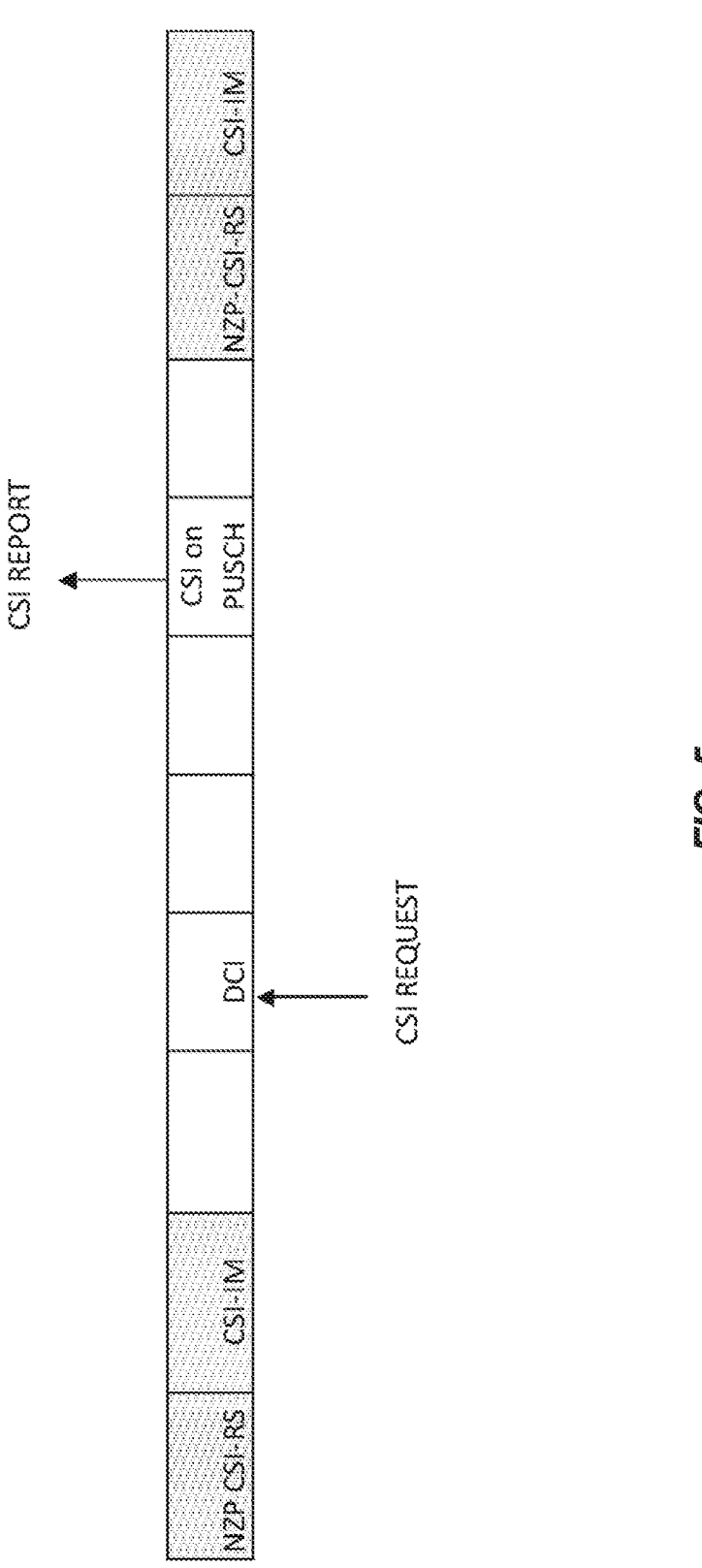
FIG. 5 is an example of aperiodic CSI reporting based on a periodic or semi-persistent NZP CSI-RS resource and a periodic or semi-persistent CSI-IM resource.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 6:
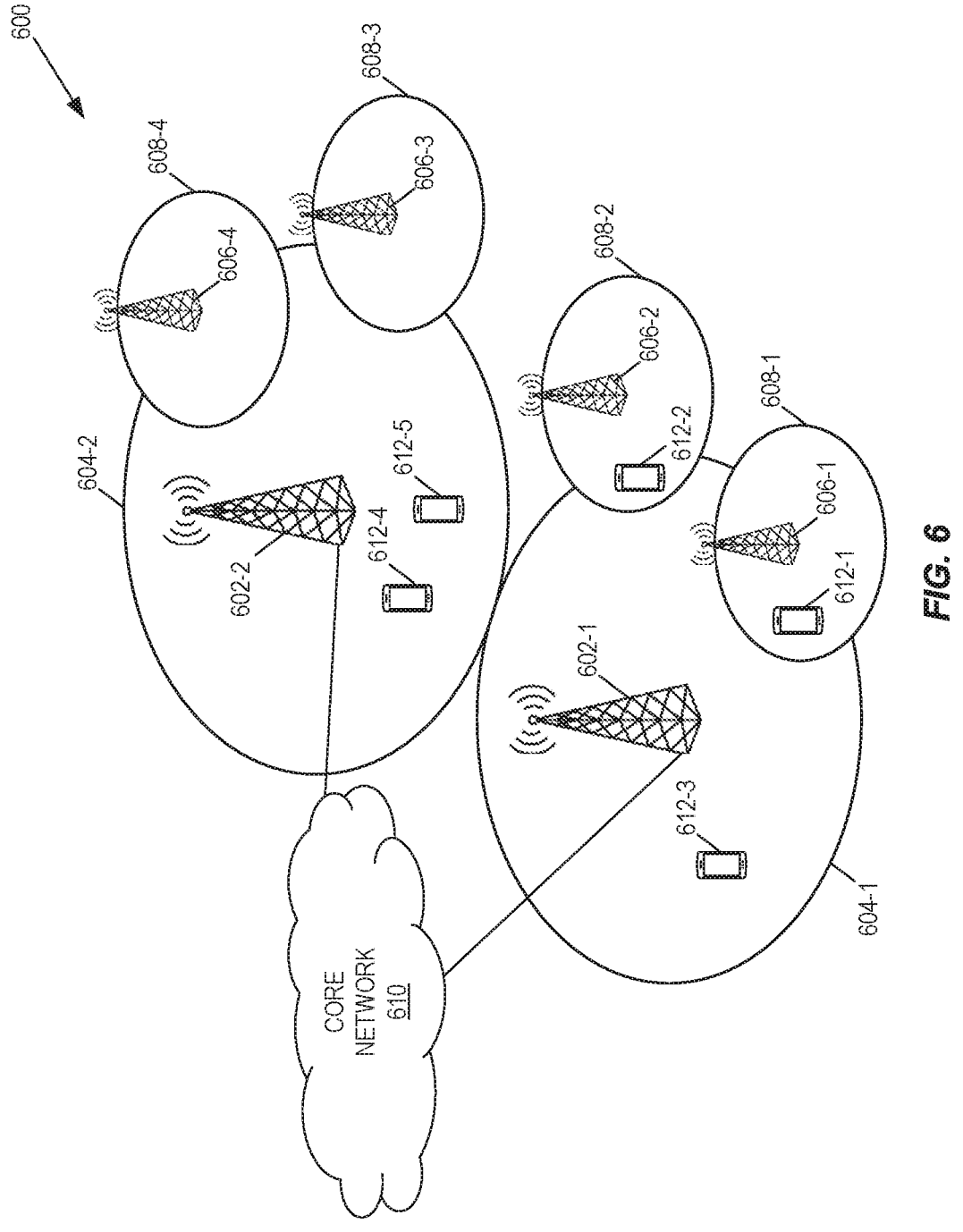
FIG. 6 illustrates one example of a cellular communications system according to some embodiments of the present disclosure.

FIG. 6 illustrates one example of a cellular communications system 600 in which embodiments of the present disclosure may be implemented. In the embodiments described herein, the cellular communications system 600 is a 5G system (5GS) including a Next Generation RAN (NG-RAN) and a 5G Core (5GC). In this example, the RAN includes base stations 602-1 and 602-2, which in the 5GS include $N_R$ base stations (gNBs) and optionally next generation eNBs (ng-eNBs) (e.g., LTE RAN nodes connected to the 5GC), controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through

606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5G System (5GS) is referred to as the 5GC. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

In the existing NR CSI reporting, a CSI-IM resource occupies either one or two OFDM symbols. The interference measured in a CSI-IM resource may not capture all interference from other cells if PDSCHs scheduled in other cells are not in the same OFDM symbols as the CSI-IM. Even if all PDSCHs in other cells are time overlapping with the CSI-IM, since the scheduled UEs in other cells could change from one slot to another, the measured interference in one slot is not necessarily the same as the one in a slot where a PDSCH is scheduled based on the reported CQI. Therefore, how to provide more accurate CSI feedback or more feedback information to meet low BLER requirement while maximizing the spectrum efficiency is a problem.

Systems and methods for CSI enhancements are provided. FIG. 7 illustrates a method performed by a wireless device for reporting channel conditions, according to some other embodiments of the present disclosure. In some embodiments, a method performed by a wireless device for reporting channel conditions includes one or more of: receiving (step 700) a CSI-IM pattern; and reporting (step 702) channel conditions based on the CSI-IM pattern. In some embodiments, the CSI-IM pattern spans multiple Orthogonal Frequency-Division Multiplexing (OFDM) symbols on a single subcarrier in a slot. In this way, these CSI-IM patterns might allow better interference measurement by capturing interference in all OFDM symbols in a slot and thus more accurate interference estimation and CSI feedback. The enhanced aperiodic CSI might allow interference variations over time to be measured and reported so that proper margins can be applied by the base station in downlink scheduling to ensure reliable data delivery while maintaining high spectrum efficiency. In some embodiments, these techniques are used for Ultra reliable and Low Latency Communication (URLLC).

FIG. 8 illustrates a method performed by a base station for receiving channel state information, according to some other embodiments of the present disclosure. In some embodiments, a method performed by a base station for receiving channel conditions includes one or more of: transmitting (step 800) a CSI-IM pattern; and receiving (step 802) a channel conditions report based on the CSI-IM pattern.

Figure 9:
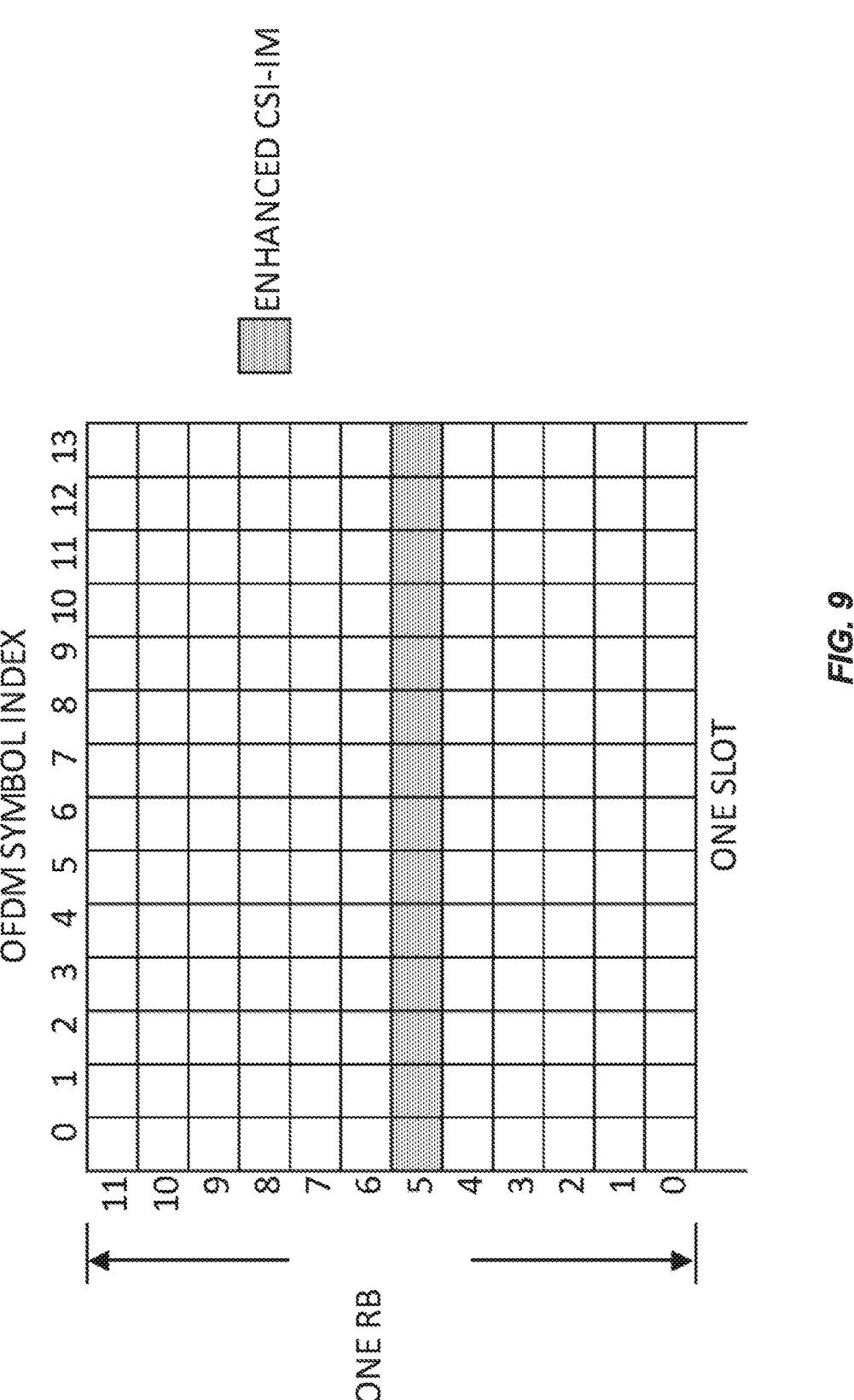
FIG. 9, where an CSI-IM resource contains REs in all OFDM symbols in a subcarrier in a PRB, according to some other embodiments of the present disclosure.

In this embodiment, CSI-IM resource is defined across a whole slot so that interference in all OFDM symbols from other cells can be captured. An example is shown in FIG. 9, where a CSI-IM resource contains REs in all OFDM symbols in a subcarrier in a PRB. This enables a UE to measure interference in all OFDM symbols so that a more accurate CQI can be obtained and reported.

To support the enhanced CSI-IM resource, in a first embodiment, a new CSI-IM pattern is introduced in the CSI-IM-Resource information element (IE) in RRC signaling. A first example is shown below. In this example, 'pattern2' is introduced which only consists of the subcarrierLocation-p2 which can be flexibly set to any one of subcarriers 0-11 within a PRB (note that 'sx' below represents the $x^{th}$ subcarrier within a PRB). Although 'subcarrierLocation-p2' is ENUMERATED in the example below, 'subcarrierLocation-p2' can be signaled as an INTEGER in an alternative embodiment. In this embodiment, the enhanced CSI-IM resource covers all the OFDM symbols (i.e., 0-13) within a slot, hence the OFDM symbol location is not signaled explicitly to the UE.

A first example of signaling the enhanced CSI-IM resource to the UE. CSI-IM-Resource information element:

```
-- ASN1START
-- TAG-CSI-IM-RESOURCE-START
CSI-IM-Resource ::=                    SEQUENCE {
    csi-IM-ResourceId                  CSI-IM-ResourceId,
    csi-IM-ResourceElementPattern      CHOICE {
      pattern0                           SEQUENCE {
        subcarrierLocation-p0              ENUMERATED {
s0, s2, s4, s6, s8, s10 },
        symbolLocation-p0                  INTEGER
(0..12)
      },
      pattern1                           SEQUENCE {
        subcarrierLocation-p1              ENUMERATED {
s0, s4, s8 },
        symbolLocation-p1                  INTEGER
(0..13)
      }
      pattern2                           SEQUENCE {
        subcarrierLocation-p2              ENUMERATED
{s0,s1,s2,s3,s4,s5,s6,s7,s8,s9,s10,s11}
      },
    }
  OPTIONAL, -- Need M
    freqBand                           CSI-FrequencyOccupation
  OPTIONAL, -- Need M
    periodicityAndOffset               CSI-ResourcePeriodicityAndOffset
  OPTIONAL, -- Cond PeriodicOrSemiPersistent
    ...
}
-- TAG-CSI-IM-RESOURCE-STOP
-- ASN1 STOP
```

The CSI-IM resource signalled by the CSI-IM resource information element can be described as in each of the PRBs configured by freqBand, the UE shall assume each CSI-IM resource is located in, resource elements $(k_{CSI-IM}, l_{CSI-IM})$, $(k_{CSI-IM}, l_{CSI-IM}+1)$, $(k_{CSI-IM}+1, l_{CSI-IM})$ and $(k_{CSI-IM}+1, l_{CSI-IM}+1)$, if CSI-IM-ResourceElementPattern is set to 'pattern0', resource elements $(k_{CSI-IM}, l_{CSI-IM})$, $(k_{CSI-IM}+1, l_{CSI-IM})$, $(k_{CSI-IM}+2, l_{CSI-IM})$ and $(k_{CSI-IM}+3, l_{CSI-IM})$ if CSI-IM-ResourceElementPattern is set to 'pattern1', resource elements $(k_{CSI-IM}, 1)$, $(k_{CSI-IM}, 2)$, $(k_{CSI-IM}, 3)$ to $(k_{CSI-IM}, l_{CSI-IM}+13)$ if CSI-IM-ResourceElementPattern is set to 'pattern2', where $k_{CSI-IM}$ and $l_{CSI-IM}$ are the configured subcarrier location and symbol location, respectively, given by the higher layer parameters in the CSI-IM-Resource IE.

The new enhanced CSI-IM resource can be configured for periodic, semi-persistent, or aperiodic transmission.

In some cases, certain symbols may be configured for CORESETs for PDCCH reception. In this case, using all the symbols of a subcarrier for enhanced CSI-IM may not be beneficial. Hence, in another embodiment, the enhanced CSI-IM may consist of a pattern that has configurable start symbol location and symbol duration. With this embodiment, the start symbol of the enhanced CSI-IM can be flexibly configured via higher layer configuration along with the symbol duration of the enhanced CSI-IM.

Figure 10:
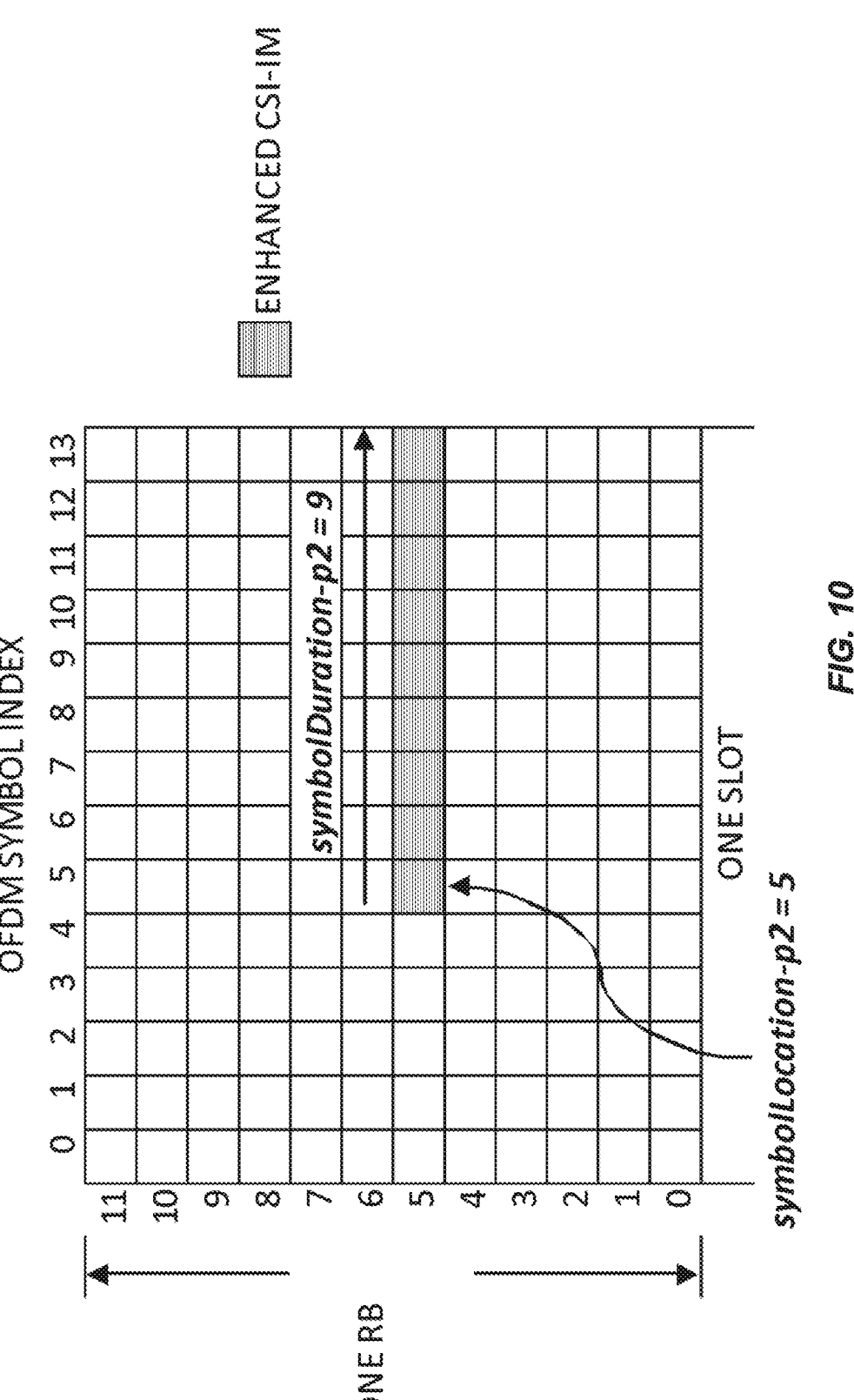
FIG. 10 shows a second example of enhanced CSI-IM resource where the start symbol location is symbol 5 and the symbol duration is 9 symbols, according to some other embodiments of the present disclosure.

FIG. 10 shows a second example of enhanced CSI-IM resource where the start symbol location is symbol 5 and the symbol duration is 9 symbols.

The signaling for this embodiment is shown below. A second example of signaling the enhanced CSI-IM resource to the UE. In this example, 'pattern2' consists of the following:

subcarrierLocation-p2 which can be flexibly set to any one of subcarriers 0-11 within a PRB, symbolLocation-p2 which can be flexibly set to any one of the OFDM symbol indices 0-13 in a slot, and symbolDuration-p2 which can be a configurable symbol duration such that symbolLocation-p2+symbolDuration-p2<=14 (i.e., the symbol duration is chosen such that the enhanced CSI-IM pattern is within a slot).

| CSI-IM-Resource information element | |
|---|---|
| -- ASN1START | |
| -- TAG-CSI-IM-RESOURCE-START | |
| CSI-IM-Resource ::= | SEQUENCE { |
| csi-IM-ResourceId | CSI-IM-ResourceId, |
| csi-IM-ResourceElementPattern | CHOICE { |
| pattern0 | SEQUENCE { |
| subcarrierLocation-p0 | ENUMERATED { |
| s0, s2, s4, s6, s8, s10 }, | |
| symbolLocation-p0 | INTEGER |
| (0..12) | |
| }, | |
| pattern1 | SEQUENCE { |
| subcarrierLocation-p1 | ENUMERATED { |
| s0, s4, s8 }, | |
| symbolLocation-p1 | INTEGER |
| (0..13) | |
| } | |
| pattern2 | SEQUENCE { |
| subcarrierLocation-p2 | ENUMERATED |
| {s0,s1,s2,s3,s4,s5,s6,s7,s8,s9,s10,s11}, | |
| symbolLocation-p2 | INTEGER (0..10) |
| symbolDuration-p2 | INTEGER |
| (4..14) | |
| }, | |
| } | |
| OPTIONAL, -- Need M | |
| freqBand | CSI-FrequencyOccupation |
| OPTIONAL, -- Need M | |
| periodicityAndOffset | CSI-ResourcePeriodicityAndOffset |
| OPTIONAL, -- Cond PeriodicOrSemiPersistent | |
| ... | |
| } | |
| -- TAG-CSI-IM-RESOURCE-STOP | |
| -- ASN1STOP | |

The corresponding CSI-IM resource with "pattern2" configured by the CSI-IM-Resource IE can be described as in each of the PRBs configured by freqBand, the UE shall assume each CSI-IM resource is located in, resource elements $(k_{CSI-IM}, l_{CSI-IM})$, $(k_{CSI-IM}, l_{CSI-IM}+1)$, $(k_{CSI-IM}, l_{CSI-IM}+2)$, . . . , $(k_{CSI-IM}, l_{CSI-IM}+L-1)$, where $k_{CSI-IM}$, $l_{CSI-IM}$, and L are the configured subcarrier location, symbol location, and symbol duration, respectively, given by the higher layer parameters in the CSI-IM-Resource IE.

Figure 11:
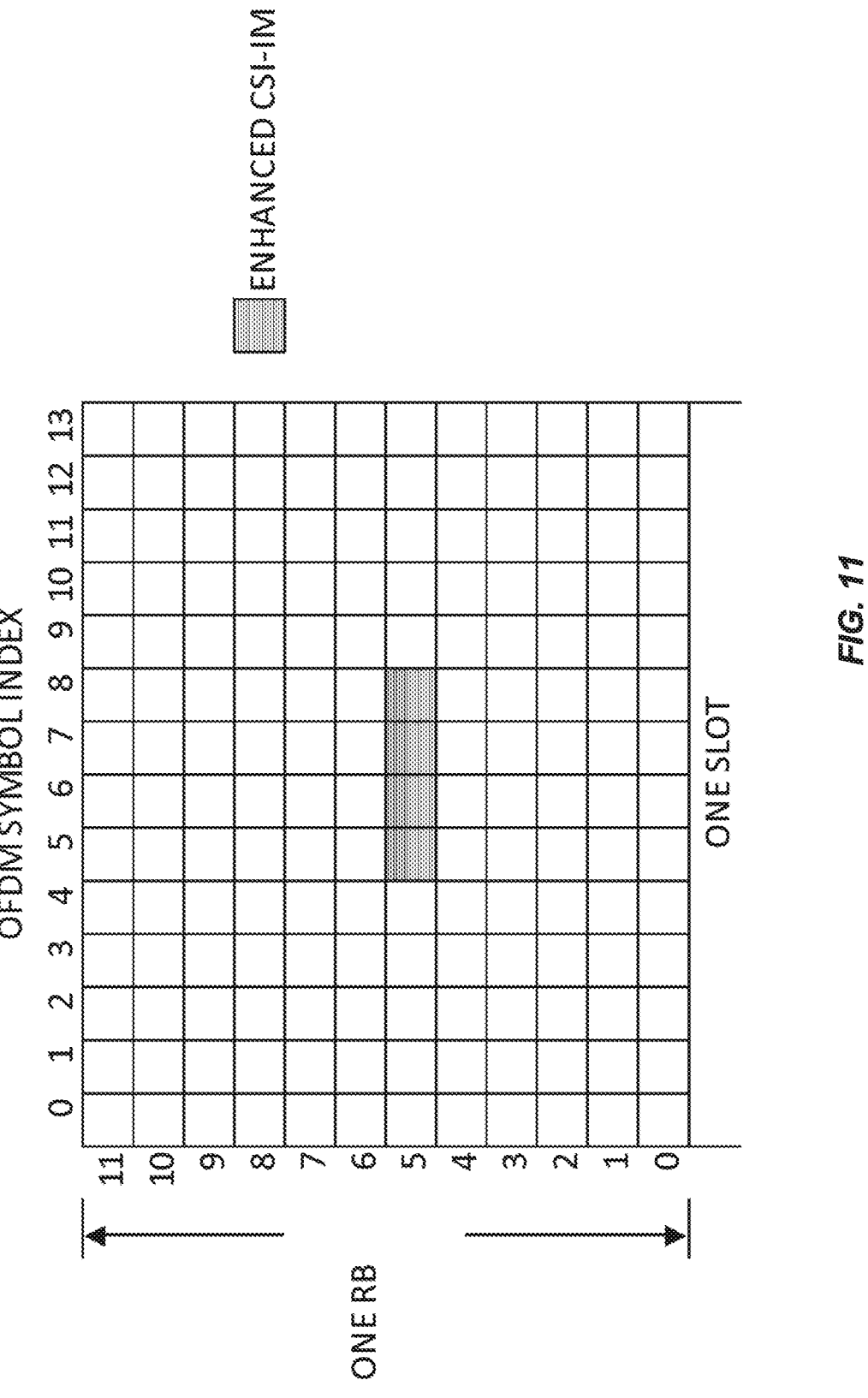
FIG. 11 illustrates an example where the duration of the new CSI-IM pattern is fixed to L OFDM symbols in one subcarrier of a PRB, according to some other embodiments of the present disclosure.

In another embodiment, the duration of the new CSI-IM pattern is fixed to L OFDM symbols in one subcarrier of a PRB, where 14>=L>=4. An example for L=4 is illustrated in FIG. 11. Note that the 4 symbols by 1 subcarrier pattern means that it occupies 4 REs, the same as existing CSI-IM patterns. Thus, the overhead is the same as the existing CSI-IMs.

In this case, the duration parameter, symbolDuration-p2, is not needed anymore. The RRC configuration and resource element description are shown below.

| CSI-IM-Resource information element | |
|---|---|
| -- ASN1START | |
| -- TAG-CSI-IM-RESOURCE-START | |
| CSI-IM-Resource ::= | SEQUENCE { |
| csi-IM-ResourceId | CSI-IM-ResourceId, |
| csi-IM-ResourceElementPattern | CHOICE { |
| pattern0: | SEQUENCE { |
| subcarrierLocation-p0 | ENUMERATED { |
| s0, s2, s4, s6, s8, s10 }, | |
| symbolLocation-p0 | INTEGER |
| (0..12) | |
| }, | |
| pattern1 | SEQUENCE { |
| subcarrierLocation-p1 | ENUMERATED { |
| s0, s4, s8 }, | |
| symbolLocation-p1 | INTEGER |
| (0..13) | |
| } | |
| pattern2 | SEQUENCE { |
| subcarrierLocation-p2 | ENUMERATED |
| {s0,s1,s2,s3,s4,s5,s6,s7,s8,s9,s10,s11}, | |
| symbolLocation-p2 | INTEGER (0..10) |
| }, | |
| } | |
| OPTIONAL, -- Need M | |
| freqBand | CSI-FrequencyOccupation |
| OPTIONAL, -- Need M | |
| periodicityAndOffset | CSI-ResourcePeriodicityAndOffset |
| OPTIONAL, -- Cond PeriodicOrSemiPersistent | |
| ... | |
| } | |
| -- TAG-CSI-IM-RESOURCE-STOP | |
| -- ASN1STOP | |

The corresponding CSI-IM resource with "pattern2" configured by the CSI-IM-Resource IE can be described as in each of the PRBs configured by freqBand, the UE shall assume each CSI-IM resource is located in, resource elements $(k_{CSI-IM}, l_{CSI-IM})$, $(k_{CSI-IM}, l_{CSI-IM}+1)$, $(k_{CSI-IM}, l_{CSI-IM}+2)$ and $(k_{CSI-IM}, l_{CSI-IM}+3)$, where $k_{CSI-IM}$ and are the configured subcarrier location and symbol location, respectively, given by the higher layer parameters in the CSI-IM-Resource IE.

Figure 12:
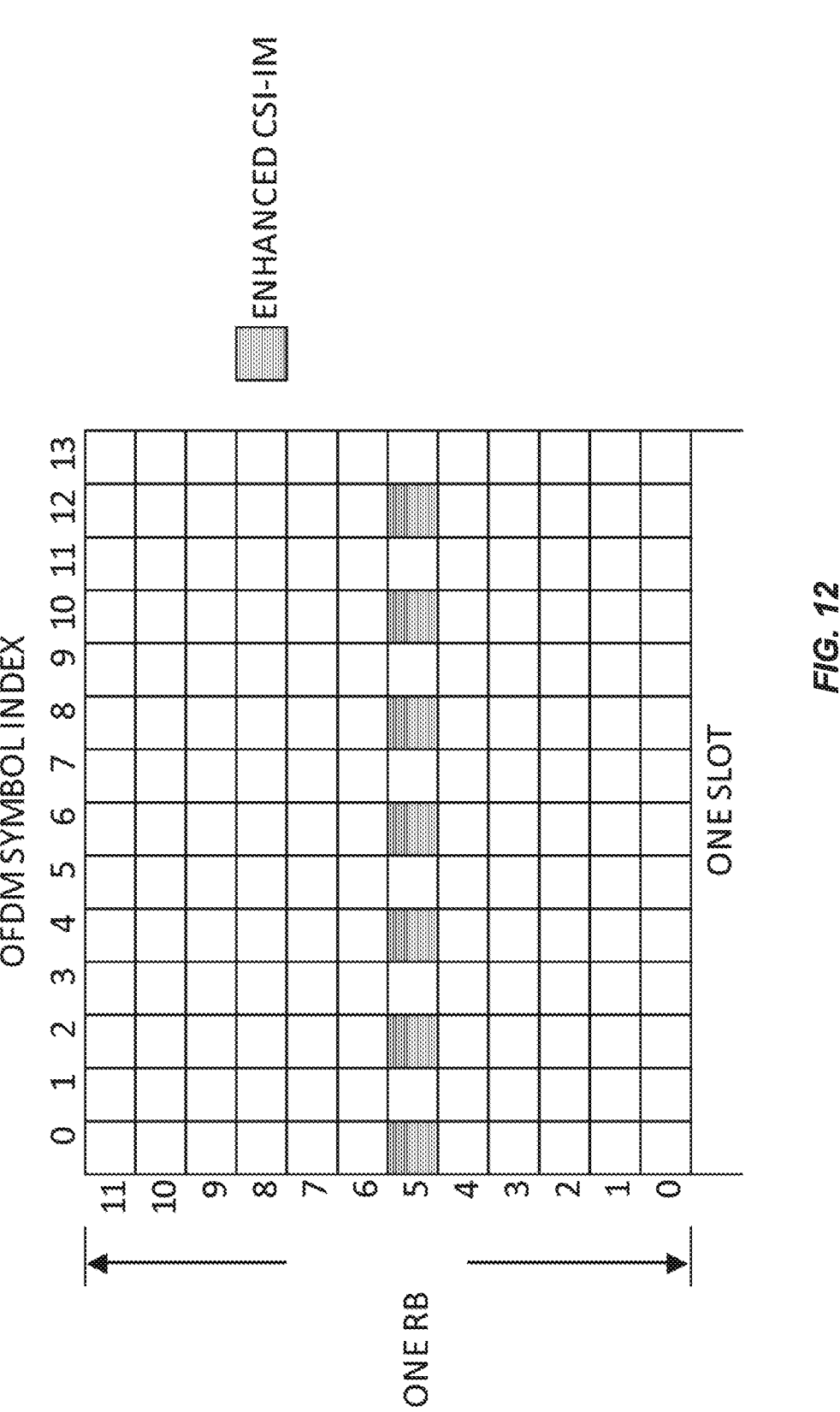
FIG. 12 illustrates the enhanced CSI-IM may be defined in every other OFDM symbols in a PRB, according to some other embodiments of the present disclosure.

To reduce overhead associated with the above enhanced CSI-IM design, the CSI-IM may not be defined on every OFDM symbol in a slot. In one embodiment, the enhanced CSI-IM may be defined in every other OFDM symbols in a PRB. An example is shown in FIG. 12. Since a PDSCH occupies minimum two OFDM symbols, any interfering PDSCH from other cells can still be captured by this reduced density CSI-IM.

The corresponding higher layer signaling for the above two embodiments is shown below, where the enhanced CSI-IM pattern is configured via pattern2. An example of signaling the enhanced CSI-IM resource with different symbol densities to the UE.

As part of pattern2, the following can be configured:

subcarrierLocation-p2, which can be flexibly set to any one of subcarriers 0-11 within a PRB symbolLocation-p2, which provides the starting symbol location in a slot, and symbolDensity-p2, a configurable symbol density such that a CSI-IM resource element is present in every $(symbolDensity-p2)^{th}$ symbol starting from the starting symbol symbolLocation-p2 within a slot.

CSI-IM-Resource information element

```
-- ASN1START
-- TAG-CSI-IM-RESOURCE-START
CSI-IM-Resource ::=                          SEQUENCE {
    csi-IM-ResourceId                        CSI-IM-ResourceId,
    csi-IM-ResourceElementPattern            CHOICE {
        pattern0                             SEQUENCE {
            subcarrierLocation-p0            ENUMERATED
{ s0, s2, s4, s6, s8, s10 },
            symbolLocation-p0                INTEGER
(0..12)
        },
        pattern1                             SEQUENCE {
            subcarrierLocation-p1            ENUMERATED
{ s0, s4, s8 },
            symbolLocation-p1                INTEGER
(0..13)
        }
        pattern2                             SEQUENCE {
            subcarrierLocation-p2            ENUMERATED
{s0,s1,s2,s3,s4,s5,s6,s7,s8,s9,s10,s11},
            symbolLocation-p2                INTEGER (0, 1, 2, 3)
            symbolDensity-p2                 INTEGER
(1, 2, 3)
        },
    }
OPTIONAL, -- Need M
    freqBand                    CSI-FrequencyOccupation
OPTIONAL, -- Need M
    periodicityAndOffset        CSI-ResourcePeriodicityAndOffset
OPTIONAL, -- Cond PeriodicOrSemiPersistent
    ...
}
-- TAG-CSI-IM-RESOURCE-STOP
-- ASN1STOP
```

Figure 13:
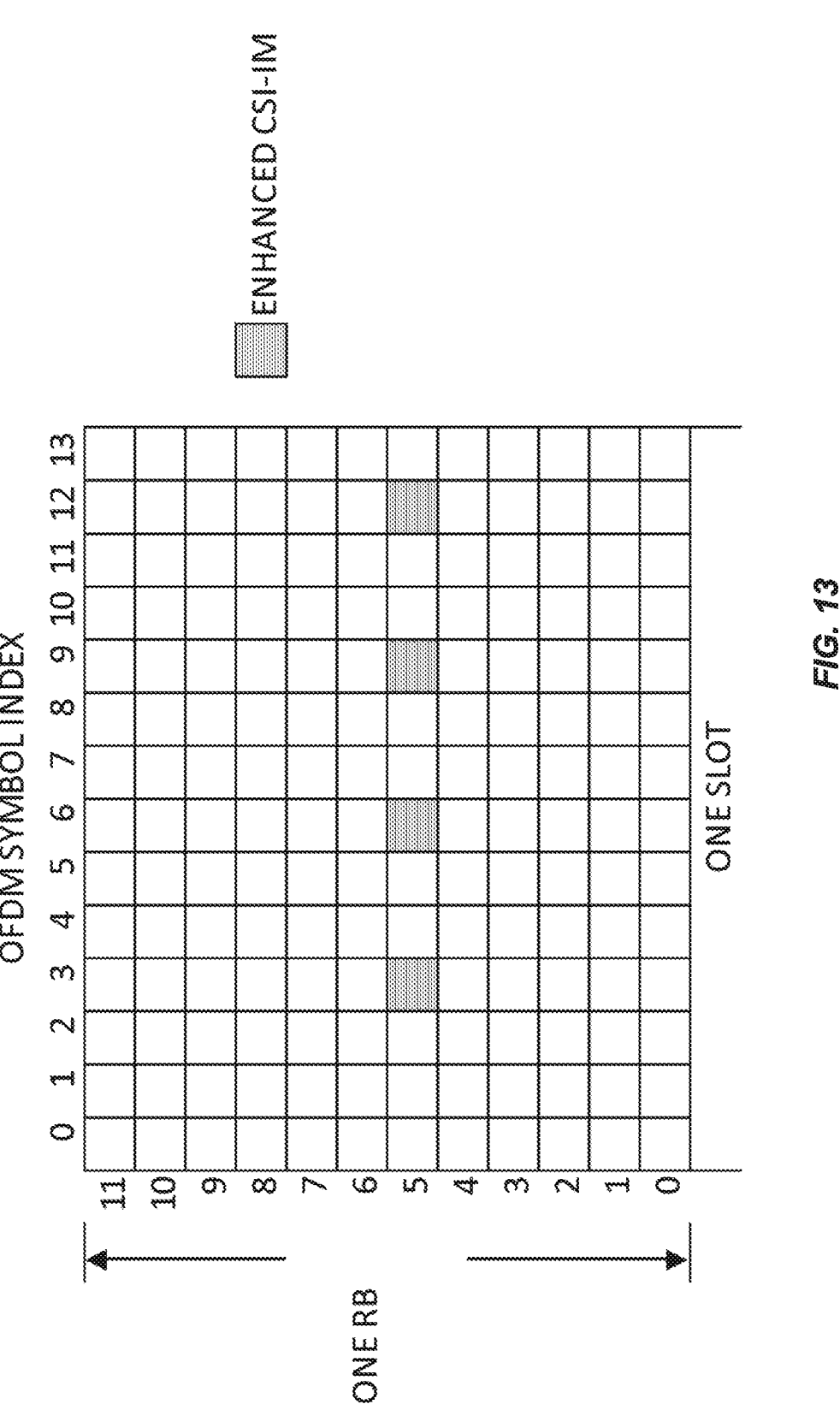
FIG. 13 illustrates the enhanced CSI-IM has the same number of REs as the existing CSI-IM but evenly distributed in 4 OFDM symbols in a slot, according to some other embodiments of the present disclosure.

In another variance, the enhanced CSI-IM has the same number of REs as the existing CSI-IM but evenly distributed in 4 OFDM symbols in a slot. An example is shown in FIG. 13. This can be achieved by configuring the pattern2 with subcarrierLocation-p2=s5
symbolLocation-p2=3
symbolDensity-p2=3

In some other cases, certain symbols may not be valid (i.e., symbols may be uplink symbols) or there may be other reference signals/channels in these certain symbols. In this case, using contiguous symbols in the time domain for enhanced CSI-IM as shown in FIG. 9 and FIG. 10 may not be suitable.

Figure 14:
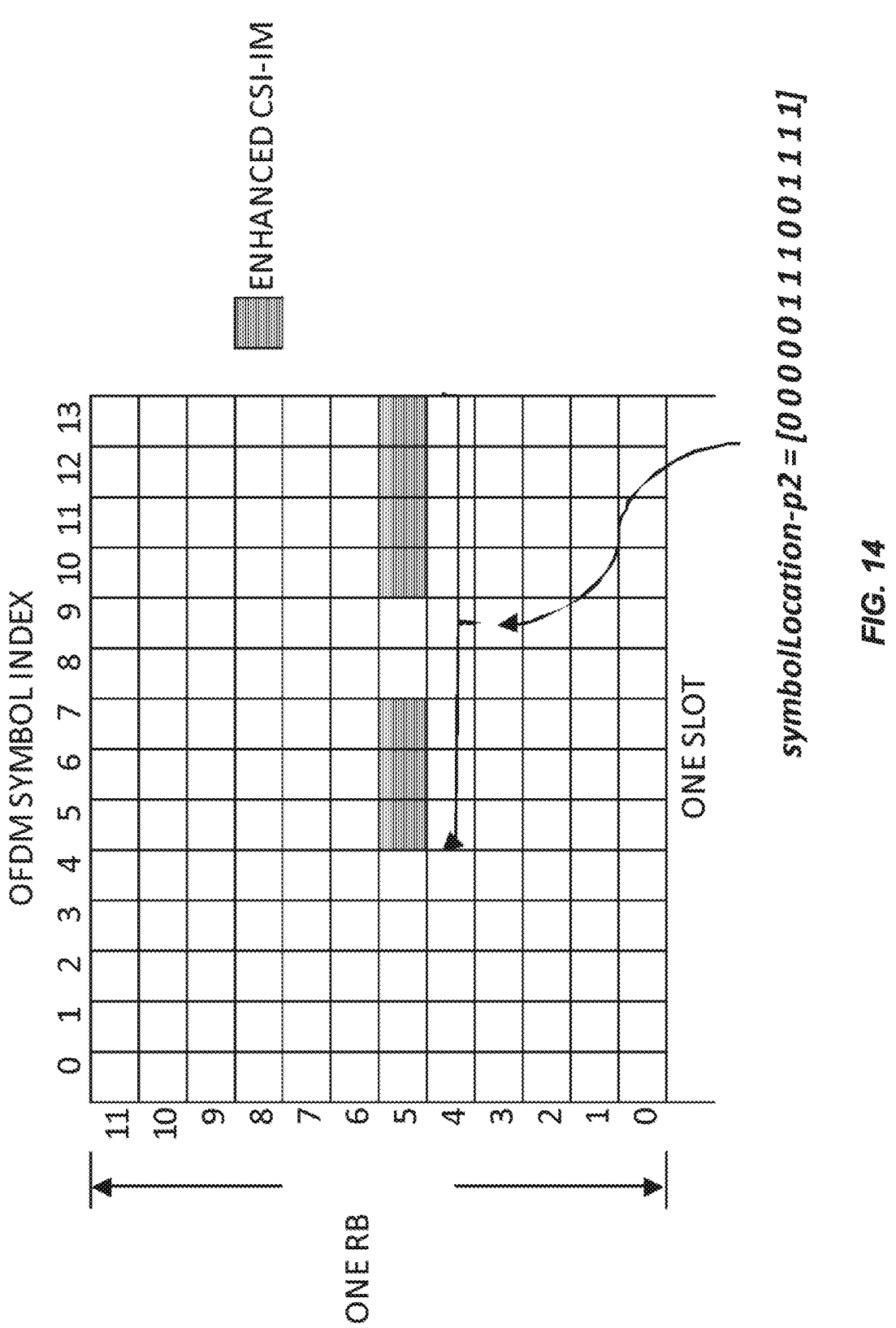
FIG. 14 illustrates the enhanced CSI-IM may consist of a pattern with non-contiguous OFDM symbols in the time domain for enhanced CSI-IM, according to some other embodiments of the present disclosure.

Hence, in another embodiment, the enhanced CSI-IM may consist of a pattern with non-contiguous OFDM symbols in the time domain for enhanced CSI-IM as shown in FIG. 14. With this embodiment, which among the 14 symbols in a slot should be included in the enhanced CSI-IM can be flexibly configured for example via a bitmap. In the example of FIG. 14, symbols 5, 6, 7, 10, 11, 12, and 13 are included as part of the enhanced CSI-IM. This can be signaled to the UE via a bitmap symbolLocation-p2 with length 14 which is shown below. Another example of signaling the enhanced CSI-IM resource to the UE.

subcarrierLocation-p2 which can be flexibly set to any one of subcarriers 0-11 within a PRB
symbolLocation-p2 which can be flexibly set to any OFDM symbols in a slot with a bit map CSI-IM-Resource information element

```
-- ASN1START
-- TAG-CSI-IM-RESOURCE-START
CSI-IM-Resource ::=                          SEQUENCE {
```

CSI-IM-Resource information element

```
    csi-IM-ResourceId                        CSI-IM-ResourceId,
    csi-IM-ResourceElementPattern            CHOICE {
        pattern0                             SEQUENCE {
            subcarrierLocation-p0            ENUMERATED {
s0, s2, s4, s6, s8, s10 },
            symbolLocation-p0                INTEGER
(0..12)
        },
        pattern1                             SEQUENCE {
            subcarrierLocation-p1            ENUMERATED {
s0, s4, s8 },
            symbolLocation-p1                INTEGER
(0..13)
        }
        pattern2                             SEQUENCE {
            subcarrierLocation-p2            ENUMERATED
{s0,s1,s2,s3,s4,s5,s6,s7,s8,s9,s10,s11},
            symbolLocation-p2                BIT STRING
(SIZE (14))
        },
    }
OPTIONAL, -- Need M
    freqBand                    CSI-FrequencyOccupation
OPTIONAL, -- Need M
    periodicityAndOffset        CSI-ResourcePeriodicityAndOffset
OPTIONAL, -- Cond PeriodicOrSemiPersistent
    ...
}
-- TAG-CSI-IM-RESOURCE-STOP
-- ASN1STOP
```

Figure 15:
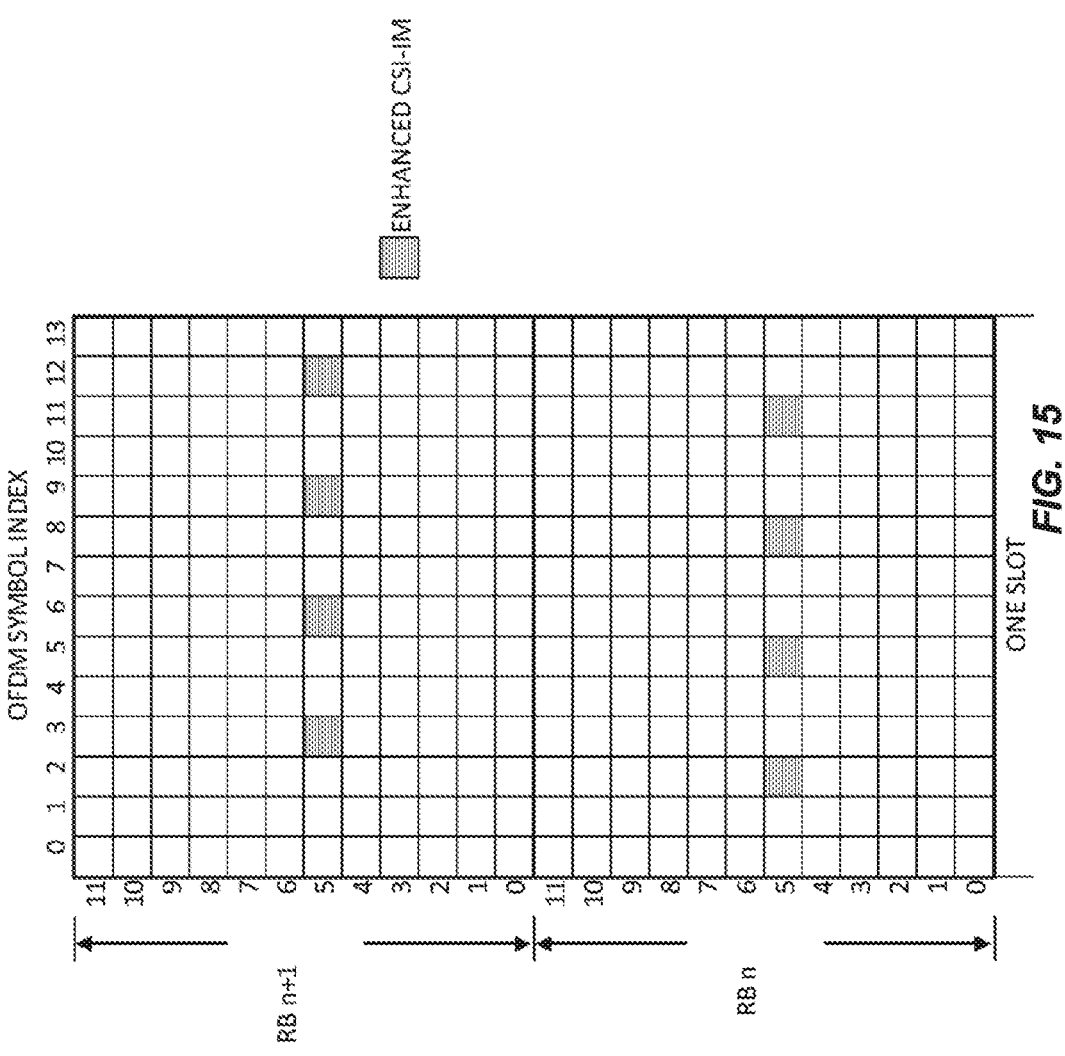
FIG. 15 illustrates a CSI-IM may be shifted in a fixed number OFDM symbols in different PRBs, according to some other embodiments of the present disclosure.

In another embodiment, a CSI-IM may be shifted in a fixed number OFDM symbols in different PRBs. An example is shown in FIG. 15, where the starting OFDM symbols in two adjacent RBs are shifted by one OFDM symbol. The benefit of the shift is that if interference in an OFDM symbol is not captured in one RB, it will be captured in the other adjacent RB, while maintaining a low CSI-IM overhead. Since the minimum length of a PDSCH is 2 OFDM symbols, the pattern in this example would capture interference from all PDSCHs from other cells.

Figure 16:
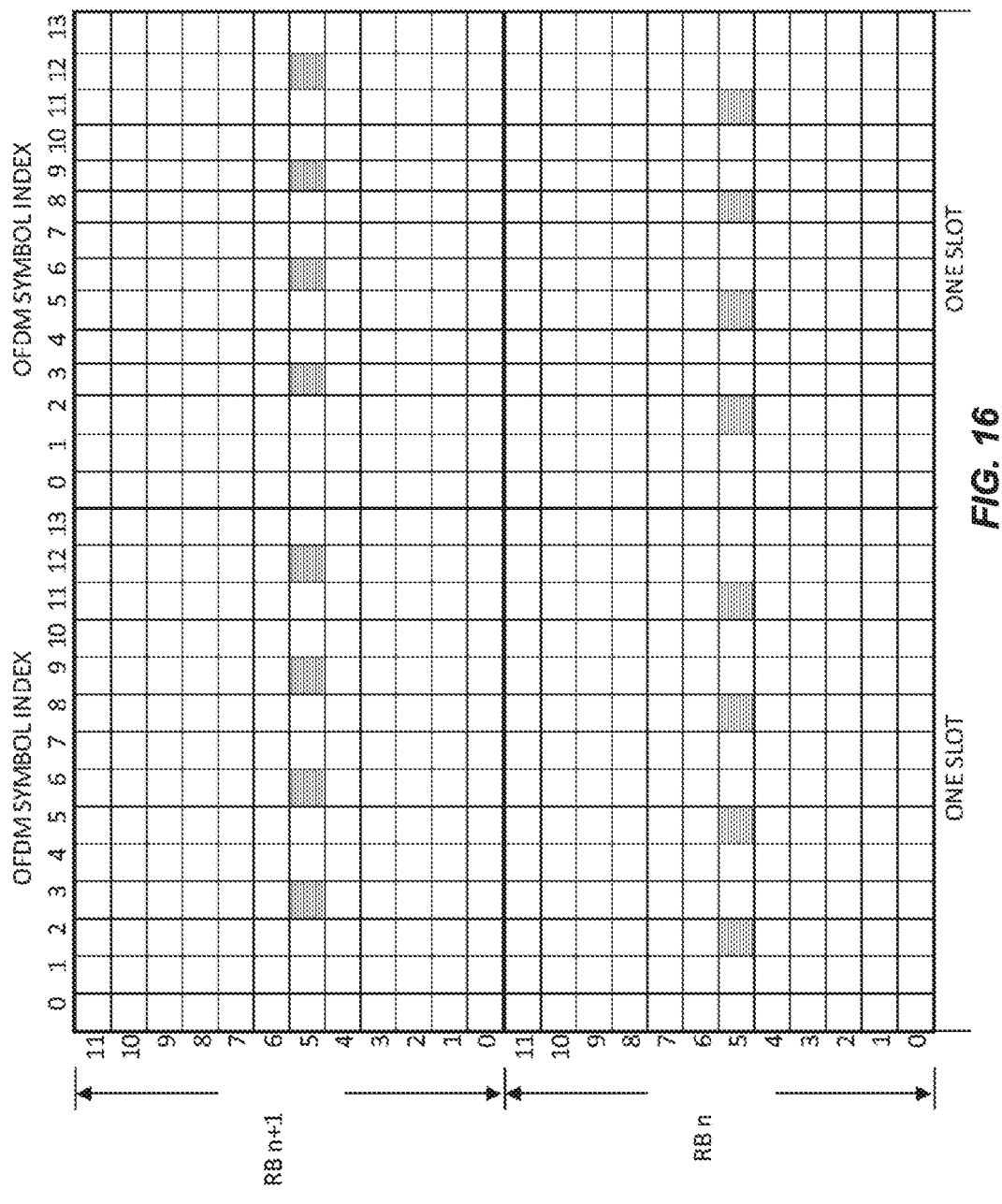
FIG. 16 illustrates the pattern in FIG. 15 could be repeated over two consecutive slots, according to some other embodiments of the present disclosure.

In a non-limiting embodiment, the periodic CSI-IM pattern is repeated over multiple slot within the periodicity given by periodicityAndOffset. For example, the pattern in FIG. 15 could be repeated over two consecutive slots as illustrated in FIG. 16.

Repeated pattern within the periodicity can be achieved by adding a repetitionFactor as the highlighted below. The values r2, r4, r8 and r16 corresponds to 2, 4, 8 and 16 consecutive slots where the CSI-IM pattern is present. The values are given as example values, i.e. in other examples of this embodiment different values apply.

```
-- ASN1START
-- TAG-CSI-IM-RESOURCE-START
CSI-IM-Resource ::=                          SEQUENCE {
    csi-IM-ResourceId                        CSI-IM-ResourceId,
    csi-IM-ResourceElementPattern            CHOICE {
        pattern0                             SEQUENCE {
            subcarrierLocation-p0            ENUMERATED {
s0, s2, s4, s6, s8, s10 },
            symbolLocation-p0                INTEGER
(0..12)
        },
        pattern1                             SEQUENCE {
            subcarrierLocation-p1            ENUMERATED {
s0, s4, s8 },
            symbolLocation-p1                INTEGER
(0..13)
        }
```

-continued

| | |
|---|---|
| pattern2 | SEQUENCE { |
| subcarrierLocation-p2 | ENUMERATED |
| {s0,s1,s2,s3,s4,s5,s6,s7,s8,s9,s10,s11}, | |
| symbolLocation-p2 | INTEGER (0..12) |
| symbolDensity-p2 | INTEGER (1, |
| 2, 3, 4) | |
| }, | |
| } | |
| OPTIONAL, -- Need M | |
| repetitionFactor | CHOICE {r2, r4, r8, r16} |
| OPTIONAL, -- Need M | |
| freqBand | CSI-FrequencyOccupation |
| OPTIONAL, -- Need M | |
| periodicityAndOffset | CSI-ResourcePeriodicityAndOffset |
| OPTIONAL, -- Cond PeriodicOrSemiPersistent | |
| ... | |
| } | |
| -- TAG-CSI-IM-RESOURCE-STOP | |
| -- ASN1STOP | |

In some examples the resulting CSI-IM pattern from repetition constitute a same CSI measurement resource for interference measurement, i.e. the interference is measured over the resulting CSI-IM and is used to determine a single CSI value, e.g. a single three-tuple (RI, PMI, CQI). In other examples, each individual CSI-IM pattern in a repetition constitute a CSI measurement resource for interference measurement to be used to capture variations in interference. The UE may determine RI, PMI and CQI at first CSI-IM pattern (e.g., first slot in FIG. 16) then for consecutive CSI-IM pattern (e.g. second slot in FIG. 16) determine CQIs given said determined RI and PMI.

In some examples, the repetitionFactor is in sub-slot resolution. For example, a repetitionFactor=r4 with 7-symbol (for normal cyclic prefix) sub-slot, i.e. half a slot, would mean that CSI-IM pattern would be repeated over 4 half-slots.

In some embodiments, instead of repeating the pattern, the new pattern can be defined for multiple slots. This might be beneficial mainly when the slot duration is quite short e.g. for higher band with higher subcarrier spacing defined so that the latency is not a problem.

As an example, as is illustrated below, 2 slots (instead of single slot) can be considered to configure one pattern, and a "slotIndex" can be included as well on top of the subcarrier location, symbol location and symbol duration. In this case the number of symbols can be up to 28. Example of signaling the enhanced CSI-IM resource to the UE, double slot configuration:

| CSI-IM-Resource information element |
|---|

| | |
|---|---|
| -- ASN1START | |
| -- TAG-CSI-IM-RESOURCE-START | |
| CSI-IM-Resource ::= | SEQUENCE { |
| csi-IM-ResourceId | CSI-IM-ResourceId, |
| csi-IM-ResourceElementPattern | CHOICE { |
| pattern0 | SEQUENCE { |
| subcarrierLocation-p0 | ENUMERATED { |
| s0, s2, s4, s6, s8, s10 }, | |
| symbolLocation-p0 | INTEGER |
| (0..12) | |
| }, | |
| pattern1 | SEQUENCE { |
| subcarrierLocation-p1 | ENUMERATED { |
| s0, s4, s8 }, | |
| symbolLocation-p1 | INTEGER |
| (0..13) | |

-continued

| CSI-IM-Resource information element | |
|---|---|
| } | |
| pattern2 | SEQUENCE { |
| subcarrierLocation-p0 | ENUMERATED { |
| s0, s1, s2, s3, s4, s5, s6, s7, s8, s9, s10,s11}, | |
| symbolLocation-p0 | INTEGER |
| (0..13), | |
| slotIndex | INTEGER (0..1), |
| symbolDuration | INTEGER (0, 27) |
| }, | |
| } | |
| freqBand | CSI-FrequencyOccupation |
| OPTIONAL, -- Need M | |
| periodicityAndOffset | CSI-ResourcePeriodicityAndOffset |
| OPTIONAL, -- Cond PeriodicOrSemiPersistent | |
| ... | |
| } | |
| -- TAG-CSI-IM-RESOURCE-STOP | |
| -- ASN1STOP | |

Other Alternatives for CSI-IM Enhancements

In another alternative embodiment, the new CSI-IM resource is determined by existing pattern0 or pattern1 and additional symbol level offset and/or subcarrier level offset, where the offset parameters can be signaled in RRC, or L1 signaling or specified in the spec.

With this method, neighbor cells may select different subcarrier level offset or symbol level values from current cell, so that the interference (real signals, e.g. PDSCH, can be transmitted in other cells since the REs are not CSI-IM REs) from other cells can be received on the CSI-IM REs of current cell.

In one example, illustrated below, the subcarrier location and the symbol location for the new pattern can be determined by subcarrierLocation-p0+subcarrierLocationOffset-p0 and symbol Location-p0+symbol LocationOffset-p0 respectively, where the offset parameters are defined in the CSI-IM-Resource IE in addition to the existing pattern 0 definition. Example of signaling the enhanced CSI-IM resource to the UE, pattern0, symbolOffset and slot level offset:

| CSI-IM-Resource information element | |
|---|---|
| -- ASN1START | |
| -- TAG-CSI-IM-RESOURCE-START | |
| CSI-IM-Resource ::= | SEQUENCE { |
| csi-IM-ResourceId | CSI-IM-ResourceId, |
| csi-IM-ResourceElementPattern | CHOICE { |
| pattern0 | SEQUENCE { |
| subcarrierLocation-p0 | ENUMERATED { |
| s0, s2, s4, s6, s8, s10 }, | |
| symbolLocation-p0 | INTEGER |
| (0..12) | |
| }, | |
| pattern1 | SEQUENCE { |
| subcarrierLocation-p1 | ENUMERATED { |
| s0, s4, s8 } , | |
| symbolLocation-p1 | INTEGER |
| (0..13) | |
| } | |
| } | |
| subcarrierLocationOffset-p0 | INTEGER ( 0,1) |
| symbolLocationOffset-p0 | INTEGER (0,1) |
| freqBand | CSI-FrequencyOccupation |
| OPTIONAL, -- Need M | |
| periodicityAndOffset | CSI-ResourcePeriodicityAndOffset |
| OPTIONAL, -- Cond PeriodicOrSemiPersistent | |
| ... | |
| } | |
| -- TAG-CSI-IM-RESOURCE-STOP | |
| -- ASN1STOP | |

In another example, illustrated below, the subcarrier location and the symbol location for the new pattern can be determined by subcarrierLocation-p1+subcarrierLocation-Offset-p1 and symbolLocation-p1 (same as pattern 1) respectively. Example of signaling the enhanced CSI-IM resource to the UE, pattern1, subcarrier level offset:

| CSI-IM-Resource information element |
|---|
| -- ASN1START |
| -- TAG-CSI-IM-RESOURCE-START |
| CSI-IM-Resource ::=             SEQUENCE { |
|     csi-IM-ResourceId           CSI-IM-ResourceId, |
|     csi-IM-ResourceElementPattern    CHOICE { |
|         pattern0            SEQUENCE { |
|            subcarrierLocation-p0     ENUMERATED { |
| s0, s2, s4, s6, s8, s10 } , |
|            symbolLocation-p0        INTEGER |
| (0..12) |
|         }, |
|         pattern1            SEQUENCE { |
|            subcarrierLocation-p1     ENUMERATED { |
| s0, s4, s8 }, |
|            symbolLocation-p1        INTEGER |
| (0..13) |
|         } |
|     } |
|     subcarrierLocationOffset-p1    INTEGER ( 0,1,2,3) |
|     freqBand             CSI-FrequencyOccupation |
|     OPTIONAL, -- Need M |
|     periodicityAndOffset     CSI-ResourcePeriodicityAndOffset |
|     OPTIONAL, -- Cond PeriodicOrSemiPersistent |
|     ... |
| -- TAG-CSI-IM-RESOURCE-STOP |
| -- ASN1STOP |

In another embodiment, existing CSI-IM patterns may be aggregated to form a new CSI-IM resource. For instance, multiple existing CSI-IM patterns (e.g., multiple pattern1 CSI-IM's) may be configured and they may be aggregated to form a new CSI-IM pattern over which interference measurement is performed by the UE.

Handling Collisions with Other Signals or Channels

In some scenarios, some OFDM symbols may be occupied/used for other signals or channels such as SSB, PDCCH, DMRS, NZP CSI-RS, CORESETs, etc. in the same BWP as the CSI-IM in the serving cell. In this case, measuring interference in those OFDM symbols would result in incorrect interference measurement as those signals are from the same serving cell and are not interference. In those scenarios, rules can be defined such that when an enhanced CSI-IM overlaps with some other signals or channels (e.g., SSB, CSI-RS, DMRS, CORESETs, etc.), UE should not measure interference in the overlapping REs.

For example, in unpaired spectrum (i.e., TDD system), depending on the DL-UL pattern (cell-specifically configured, UE-specifically configured, or dynamically signaled), some slots, or some symbols in a slot, are not available for DL transmission. Hence, the configured CSI-IM transmission(s) are dropped if overlapping with UL slots (or symbols). Specifically, a symbol that is indicated as uplink by tdd-UL-DL-Configuration-Common or tdd-UL-DL-ConfigurationDedicated are considered unavailable for CSI-IM resource.

For symbols indicated by ssb-PositionsInBurst in SIB1 or ssb-PositionsInBurst in ServingCellConfigCommon for reception of SS/PBCH blocks, CSI-IM REs that overlap with REs for SS/PBCH are considered unavailable for CSI-IM resource. In some embodiment, the REs not actually used in the SS/PBCH block can be treated as or used by CSI-IM.

For symbol(s), and PRBs in the PDCCH monitoring occasions indicated by pdcch-ConfigSIB1 in MIB or by searchSpaceSIB1 in PDCCH-ConfigCommon or by searchSpaceZero in PDCCH-ConfigCommon for a CORESET for Type0-PDCCH CSS set, CSI-IM REs that overlap with REs for such CORESET in all the indicated PDCCH monitoring occasions are considered unavailable for CSI-IM resource.

For REs used by SIB1 PDSCH are not expected to be used by CSI-IM resource.

For PDSCH transmission, the CSI-IM resources associated with activated CSI report configs may be assumed not available for PDSCH. Alternatively, a new ZP CSI-RS resource may be defined for each enhanced CSI-IM to indicate to a UE that the CSI-IM resource is not available for PDSCH. The new ZP CSI-RS has the same REs as the enhanced CSI-IM resource.

Enhancement on Aperiodic CSI with Aperiodic CSI-RS/CSI-IM

In this embodiment, aperiodic CSI is enhanced by associating a CSI report configuration with one aperiodic NZP CSI-RS resource for channel measurement and an aperiodic CSI-IM where a CSI-IM resource is repeated in multiple slots for interference measurement. The benefit of this approach is that interference variations over time can be measured and such variation can be reported to gNB for making better scheduling decisions. For example, if a large variation is reported, the gNB may add a large margin in DL PDSCH scheduling to make sure that it can be received with a low error probability.

Figure 17:
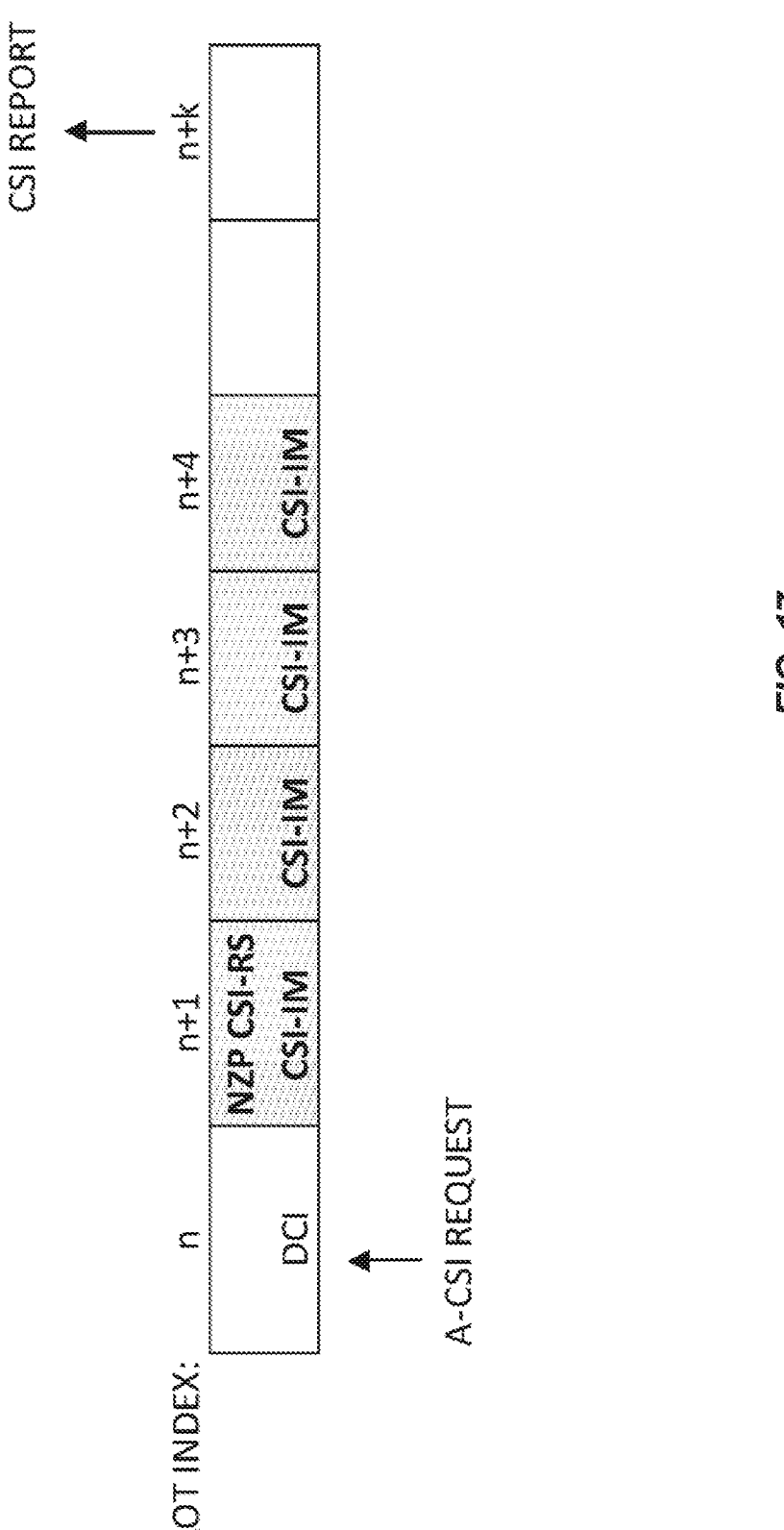
FIG. 17 illustrates a CSI is triggered at slot n and a CSI-IM is repeated in four subsequent slots, according to some other embodiments of the present disclosure.

An example is shown in FIG. 17, where a CSI is triggered at slot n and a CSI-IM is repeated in four subsequent slots (i.e., slots n+1 to n+4). In this example, the NZP CSI-RS is only transmitted in the first slot after the trigger (i.e., slot n+1). Alternatively, the NZP CSI-RS may also be repeated, which may be beneficial in high mobility scenarios but with a cost of additional DL overhead.

The number of repetitions can be either higher layer configured in a CSI report configuration or in an aperiodic CSI trigger state, or dynamically indicated in DCI. In some other embodiments, the number of repetitions may be configured as part of the CSI-IM-Resource information element. In another embodiment, to realize multiple CSI-IMs over multiple slots, multiple CSI-IM resources may be configured as part of a CSI-IM resource set where the different CSI-IM resources may have different slot offsets.

In some embodiments, the CSI-IM is repeated on sub-slot level, i.e. a periodicity shorter than a slot. For example, the CSI-IM may be repeated every 7 OFDM symbol in case of normal cyclic prefix. In addition to the existing CSI report quantities, a new CSI report quantity may be defined to include an indication of the amount of interference variations in time or both in time and frequency. In time domain, it could be reported in a form of CQI variations.

Figure 18:
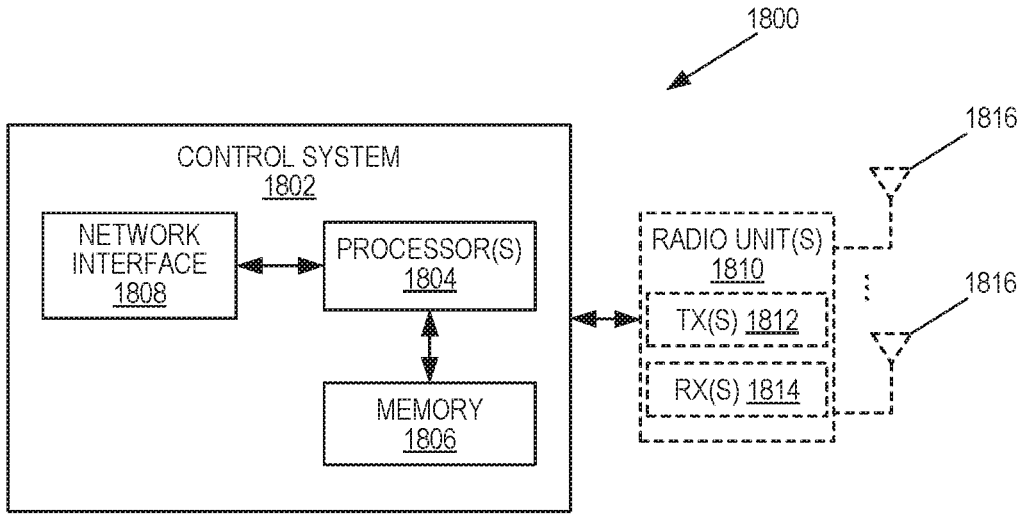
FIG. 18 is a schematic block diagram of a radio access node according to some embodiments of the present disclosure.

In some embodiments, the CSI-IM repetitions are regarded as a same CSI measurement resource for interference measurement while in other embodiments each CSI-IM are their own CSI measurement resources for interference measurement. In embodiments where each CSI-IM is a CSI measurement resource for interference measurement, the UE may use the multiple CSI-IM to deduce statistical CQI. For example, rank and pre-coder is determined based on first NZP CSI-RS and first CSI-IM (slot n+1 in FIG. 17) and then CQI is determined for each of the CSI-IM based on said determined rank and pre-coder. Alternatively, rank and pre-coder is determined based on first NZP CSI-RS and all the CSI-IMs. The CSI report may then comprise one or more of the determined rank, pre-coder and a statistical CQI measure, e.g. one or more out of mean CQI variance of CQI standard deviation of CQI minimum CQI percentile CQI value, e.g. 10-th percentile CQI FIG. 18 is a schematic block diagram of a radio access node 1800 according to some embodiments of the present disclosure. Optional features are represented by dashed boxes. The radio access node 1800 may be, for example, a base station 602 or 606 or a network node that implements all or part of the functionality of the base station 602 or gNB described herein. As illustrated, the radio access node 1800 includes a control system 1802 that includes one or more processors 1804 (e.g., Central Processing Units (CPUs), Application Specific Integrated Circuits (ASICs), Field Programmable Gate Arrays (FPGAs), and/or the like), memory 1806, and a network interface 1808. The one or more processors 1804 are also referred to herein as processing circuitry. In addition, the radio access node 1800 may include one or more radio units 1810 that each includes one or more transmitters 1812 and one or more receivers 1814 coupled to one or more antennas 1816. The radio units 1810 may be referred to or be part of radio interface circuitry. In some embodiments, the radio unit(s) 1810 is external to the control system 1802 and connected to the control system 1802 via, e.g., a wired connection (e.g., an optical cable). However, in some other embodiments, the radio unit(s) 1810 and potentially the antenna(s) 1816 are integrated together with the control system 1802. The one or more processors 1804 operate to provide one or more functions of a radio access node 1800 as described herein. In some embodiments, the function(s) are implemented in software that is stored, e.g., in the memory 1806 and executed by the one or more processors 1804.

Figure 19:
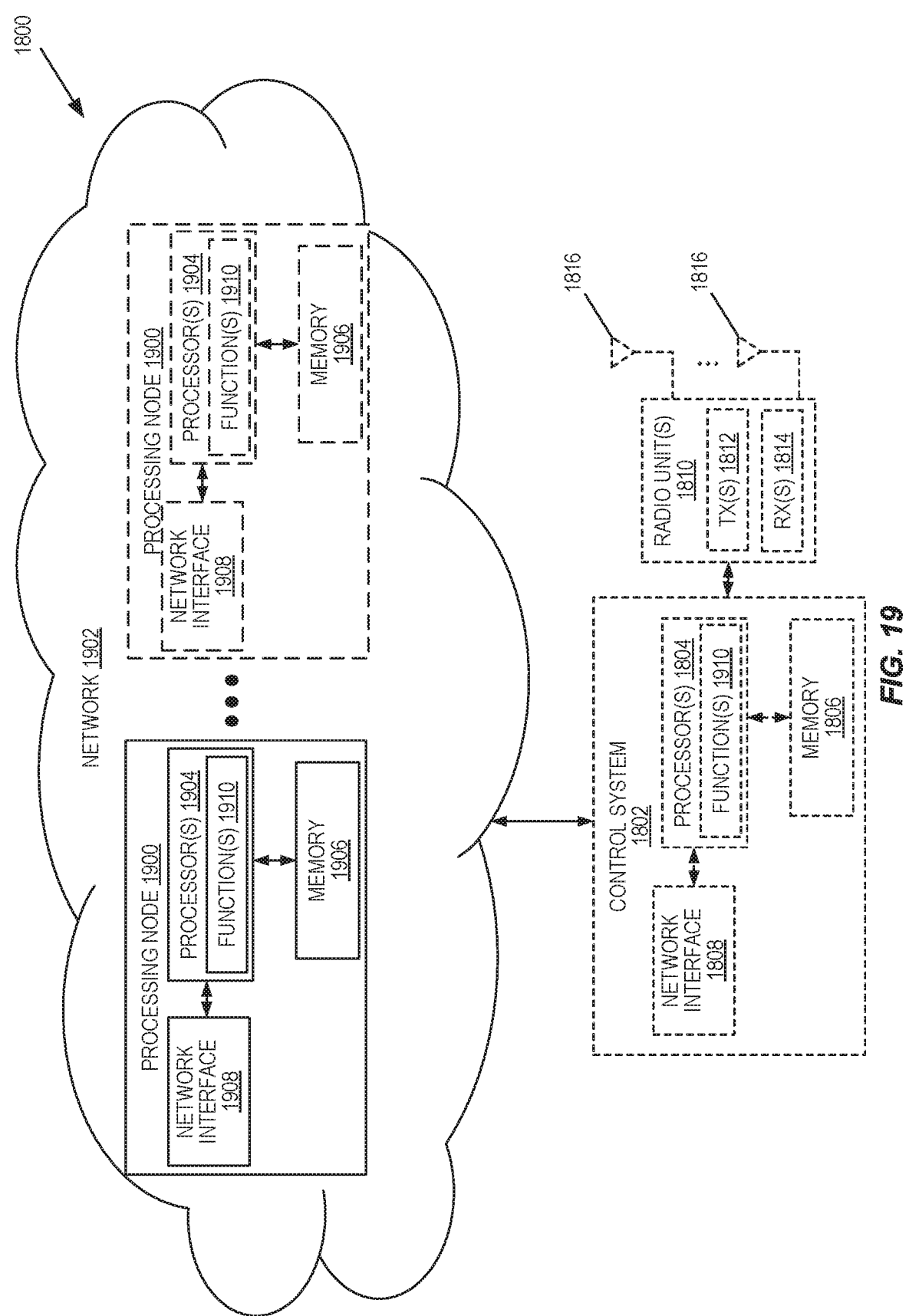
FIG. 19 is a schematic block diagram that illustrates a virtualized embodiment of the radio access node of FIG. 18 according to some embodiments of the present disclosure.

FIG. 19 is a schematic block diagram that illustrates a virtualized embodiment of the radio access node 1800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1800 in which at least a portion of the functionality of the radio access node 1800 is implemented as a virtual component(s) (e.g., via a virtual machine(s) executing on a physical processing node(s) in a network(s)). As illustrated, in this example, the radio access node 1800 may include the control system 1802 and/or the one or more radio units 1810, as described above. The control system 1802 may be connected to the radio unit(s) 1810 via, for example, an optical cable or the like. The radio access node 1800 includes one or more processing nodes 1900 coupled to or included as part of a network(s) 1902. If present, the control system 1802 or the radio unit(s) is connected to the processing node(s) 1900 via the network 1902. Each processing node 1900 includes one or more processors 1904 (e.g., CPUs, ASICs, FPGAs, and/or the like), memory 1906, and a network interface 1908.

In this example, functions 1910 of the radio access node 1800 described herein are implemented at the one or more processing nodes 1900 or distributed across the one or more processing nodes 1900 and the control system 1802 and/or the radio unit(s) 1810 in any desired manner. In some particular embodiments, some or all of the functions 1910 of the radio access node 1800 described herein are implemented as virtual components executed by one or more virtual machines implemented in a virtual environment(s) hosted by the processing node(s) 1900. As will be appreciated by one of ordinary skill in the art, additional signaling or communication between the processing node(s) 1900 and the control system 1802 is used in order to carry out at least some of the desired functions 1910. Notably, in some embodiments, the control system 1802 may not be included, in which case the radio unit(s) 1810 communicate directly with the processing node(s) 1900 via an appropriate network interface(s).

In some embodiments, a computer program including instructions which, when executed by at least one processor, causes the at least one processor to carry out the functionality of radio access node 1800 or a node (e.g., a processing node 1900) implementing one or more of the functions 1910 of the radio access node 1800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
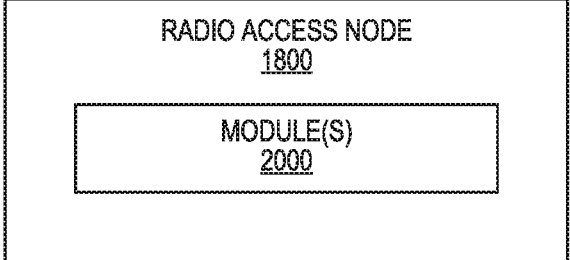
FIG. 20 is a schematic block diagram of the radio access node of FIG. 18 according to some other embodiments of the present disclosure.

FIG. 20 is a schematic block diagram of the radio access node 1800 according to some other embodiments of the present disclosure. The radio access node 1800 includes one or more modules 2000, each of which is implemented in software. The module(s) 2000 provide the functionality of the radio access node 1800 described herein. This discussion is equally applicable to the processing node 1900 of FIG. 19 where the modules 2000 may be implemented at one of the processing nodes 1900 or distributed across multiple processing nodes 1900 and/or distributed across the processing node(s) 1900 and the control system 1802.

Figure 21:
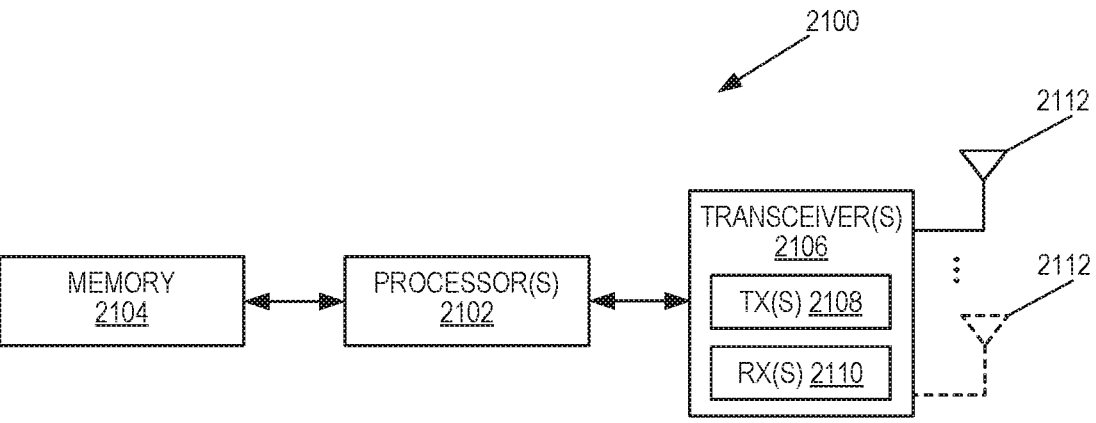
FIG. 21 is a schematic block diagram of a User Equipment device (UE) according to some embodiments of the present disclosure.

FIG. 21 is a schematic block diagram of a wireless communication device 2100 according to some embodiments of the present disclosure. As illustrated, the wireless communication device 2100 includes one or more processors 2102 (e.g., CPUs, ASICs, FPGAs, and/or the like), memory 2104, and one or more transceivers 2106 each including one or more transmitters 2108 and one or more receivers 2110 coupled to one or more antennas 2112. The transceiver(s) 2106 includes radio-front end circuitry connected to the antenna(s) 2112 that is configured to condition signals communicated between the antenna(s) 2112 and the processor(s) 2102, as will be appreciated by on of ordinary skill in the art. The processors 2102 are also referred to herein as processing circuitry. The transceivers 2106 are also referred to herein as radio circuitry. In some embodiments, the functionality of the wireless communication device 2100 described above may be fully or partially implemented in software that is, e.g., stored in the memory 2104 and executed by the processor(s) 2102. Note that the wireless communication device 2100 may include additional components not illustrated in FIG. 21 such as, e.g., one or more user interface components (e.g., an input/output interface including a display, buttons, a touch screen, a microphone, a speaker(s), and/or the like and/or any other components for allowing input of information into the wireless communication device 2100 and/or allowing output of information from the wireless communication device 2100), a power supply (e.g., a battery and associated power circuitry), etc.

In some embodiments, a computer program including instructions which, when executed by at least one processor, causes the at least one processor to carry out the functionality of the wireless communication device 2100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
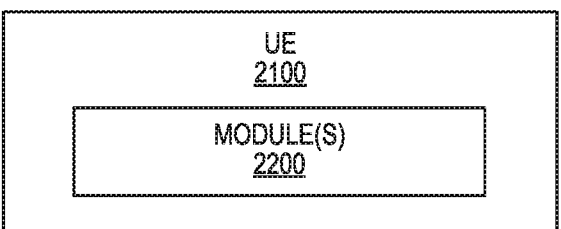
FIG. 22 is a schematic block diagram of the UE of FIG. 21 according to some other embodiments of the present disclosure.

FIG. 22 is a schematic block diagram of the wireless communication device 2100 according to some other embodiments of the present disclosure. The wireless communication device 2100 includes one or more modules 2200, each of which is implemented in software. The module(s) 2200 provide the functionality of the wireless communication device 2100 described herein.

Figure 23:
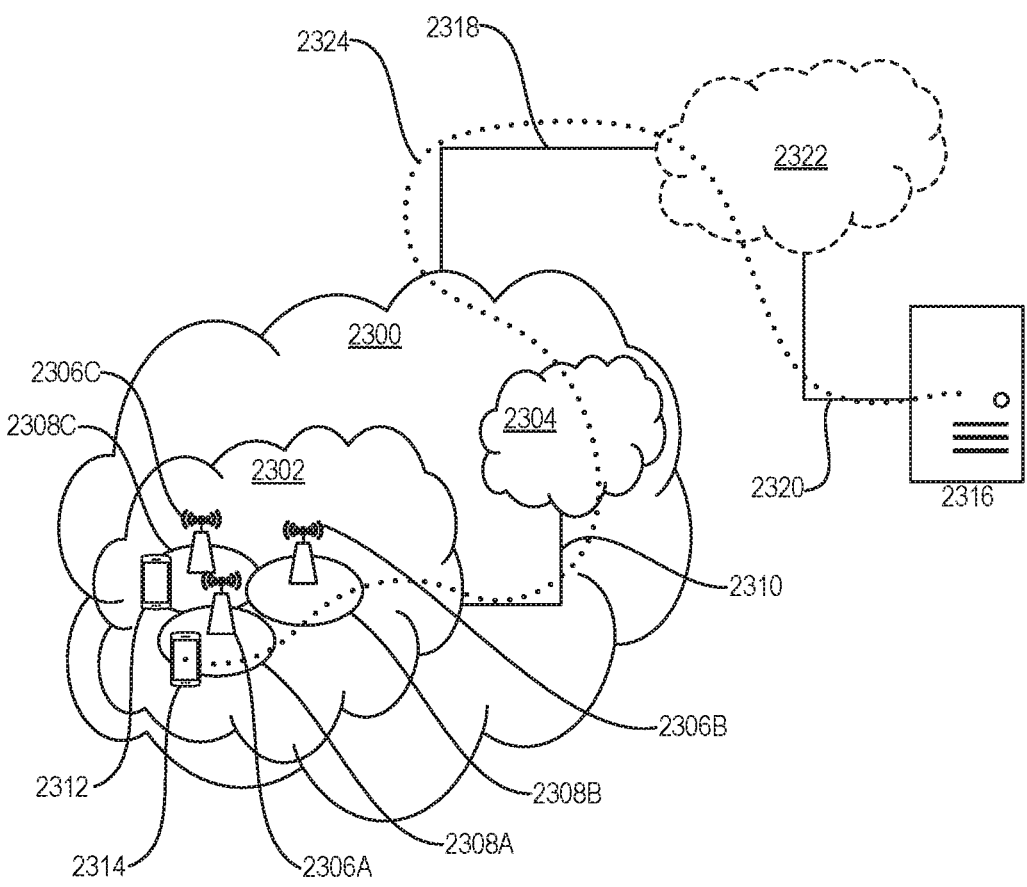
FIG. 23 illustrates a telecommunication network connected via an intermediate network to a host computer in accordance with some embodiments of the present disclosure.

With reference to FIG. 23, in accordance with an embodiment, a communication system includes a telecommunication network 2300, such as a 3GPP-type cellular network, which comprises an access network 2302, such as a RAN, and a core network 2304. The access network 2302 comprises a plurality of base stations 2306A, 2306B, 2306C, such as Node Bs, eNBs, gNBs, or other types of wireless Access Points (APs), each defining a corresponding coverage area 2308A, 2308B, 2308C. Each base station 2306A, 2306B, 2306C is connectable to the core network 2304 over a wired or wireless connection 2310. A first UE 2312 located in coverage area 2308C is configured to wirelessly connect to, or be paged by, the corresponding base station 2306C. A second UE 2314 in coverage area 2308A is wirelessly connectable to the corresponding base station 2306A. While a plurality of UEs 2312, 2314 are illustrated in this example, the disclosed embodiments are equally applicable to a situation where a sole UE is in the coverage area or where a sole UE is connecting to the corresponding base station 2306.

The telecommunication network 2300 is itself connected to a host computer 2316, which may be embodied in the hardware and/or software of a standalone server, a cloud-implemented server, a distributed server, or as processing resources in a server farm. The host computer 2316 may be under the ownership or control of a service provider, or may be operated by the service provider or on behalf of the service provider. Connections 2318 and 2320 between the telecommunication network 2300 and the host computer 2316 may extend directly from the core network 2304 to the host computer 2316 or may go via an optional intermediate network 2322. The intermediate network 2322 may be one of, or a combination of more than one of, a public, private, or hosted network; the intermediate network 2322, if any, may be a backbone network or the Internet; in particular, the intermediate network 2322 may comprise two or more sub-networks (not shown).

The communication system of FIG. 23 as a whole enables connectivity between the connected UEs 2312, 2314 and the host computer 2316. The connectivity may be described as an Over-the-Top (OTT) connection 2324. The host computer 2316 and the connected UEs 2312, 2314 are configured to communicate data and/or signaling via the OTT connection 2324, using the access network 2302, the core network 2304, any intermediate network 2322, and possible further infrastructure (not shown) as intermediaries. The OTT connection 2324 may be transparent in the sense that the participating communication devices through which the OTT connection 2324 passes are unaware of routing of uplink and downlink communications. For example, the base station 2306 may not or need not be informed about the past routing of an incoming downlink communication with data originating from the host computer 2316 to be forwarded (e.g., handed over) to a connected UE 2312. Similarly, the base station 2306 need not be aware of the future routing of an outgoing uplink communication originating from the UE 2312 towards the host computer 2316.

Example implementations, in accordance with an embodiment, of the UE, base station, and host computer discussed in the preceding paragraphs will now be described with reference to FIG. 24. In a communication system 2400, a host computer 2402 comprises hardware 2404 including a communication interface 2406 configured to set up and maintain a wired or wireless connection with an interface of a different communication device of the communication system 2400. The host computer 2402 further comprises processing circuitry 2408, which may have storage and/or processing capabilities. In particular, the processing circuitry 2408 may comprise one or more programmable processors, ASICs, FPGAs, or combinations of these (not shown) adapted to execute instructions. The host computer 2402 further comprises software 2410, which is stored in or accessible by the host computer 2402 and executable by the processing circuitry 2408. The software 2410 includes a host application 2412. The host application 2412 may be operable to provide a service to a remote user, such as a UE 2414 connecting via an OTT connection 2416 terminating at the UE 2414 and the host computer 2402. In providing the service to the remote user, the host application 2412 may provide user data which is transmitted using the OTT connection 2416.

The communication system 2400 further includes a base station 2418 provided in a telecommunication system and comprising hardware 2420 enabling it to communicate with the host computer 2402 and with the UE 2414. The hardware 2420 may include a communication interface 2422 for setting up and maintaining a wired or wireless connection with an interface of a different communication device of the communication system 2400, as well as a radio interface 2424 for setting up and maintaining at least a wireless connection 2426 with the UE 2414 located in a coverage area (not shown in FIG. 24) served by the base station 2418. The communication interface 2422 may be configured to facilitate a connection 2428 to the host computer 2402. The connection 2428 may be direct or it may pass through a core network (not shown in FIG. 24) of the telecommunication system and/or through one or more intermediate networks outside the telecommunication system. In the embodiment shown, the hardware 2420 of the base station 2418 further includes processing circuitry 2430, which may comprise one or more programmable processors, ASICs, FPGAs, or combinations of these (not shown) adapted to execute instructions. The base station 2418 further has software 2432 stored internally or accessible via an external connection.

The communication system 2400 further includes the UE 2414 already referred to. The UE's 2414 hardware 2434 may include a radio interface 2436 configured to set up and maintain a wireless connection 2426 with a base station serving a coverage area in which the UE 2414 is currently located. The hardware 2434 of the UE 2414 further includes processing circuitry 2438, which may comprise one or more programmable processors, ASICs, FPGAs, or combinations of these (not shown) adapted to execute instructions. The UE 2414 further comprises software 2440, which is stored in or accessible by the UE 2414 and executable by the processing circuitry 2438. The software 2440 includes a client application 2442. The client application 2442 may be operable to provide a service to a human or non-human user via the UE 2414, with the support of the host computer 2402. In the host computer 2402, the executing host application 2412 may communicate with the executing client application 2442 via the OTT connection 2416 terminating at the UE 2414 and the host computer 2402. In providing the service to the user, the client application 2442 may receive request data from the host application 2412 and provide user data in response to the request data. The OTT connection 2416 may transfer both the request data and the user data. The client application 2442 may interact with the user to generate the user data that it provides.

Figure 24:
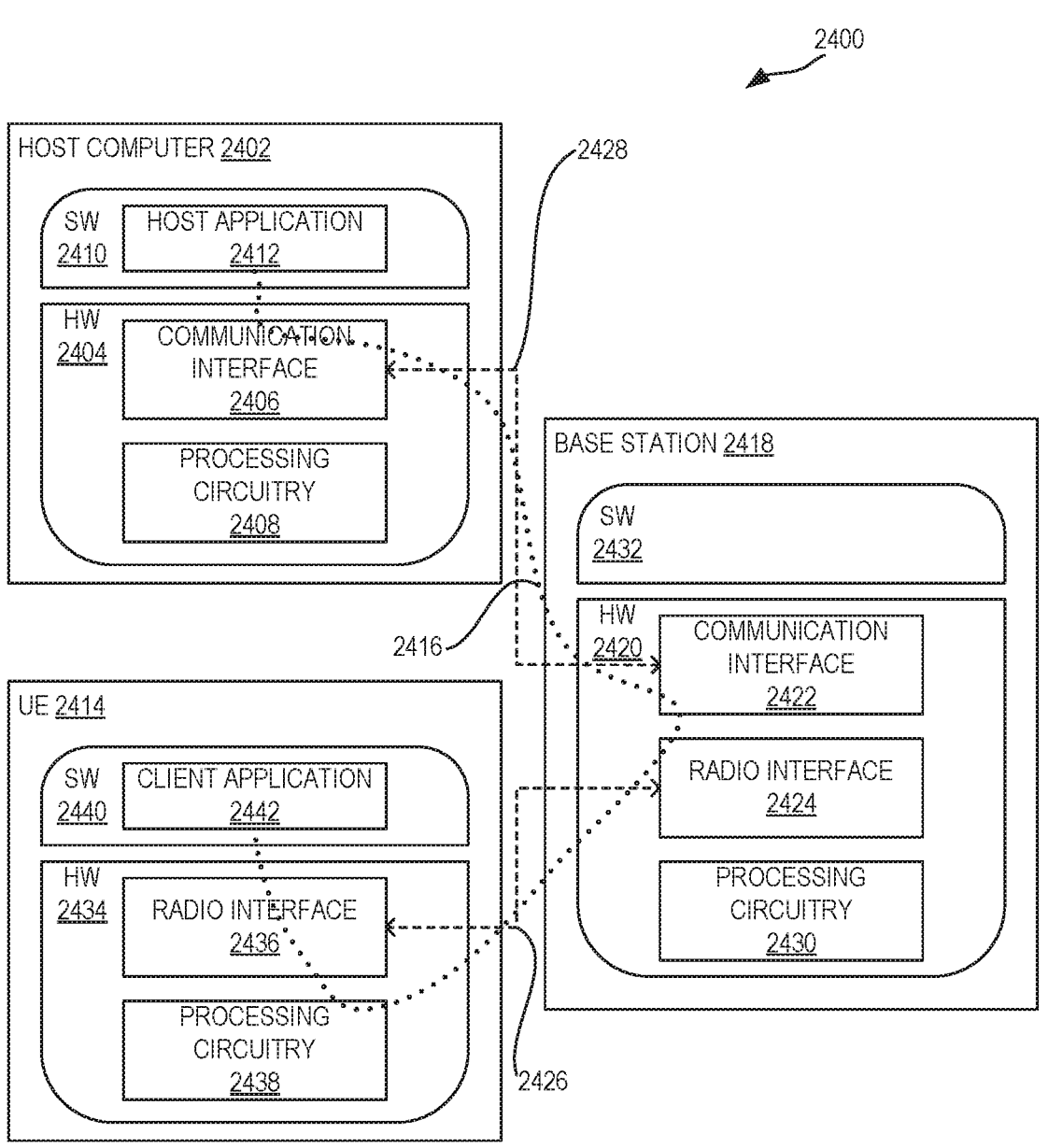
FIG. 24 is a generalized block diagram of a host computer communicating via a base station with a UE over a partially wireless connection in accordance with some embodiments of the present disclosure.

It is noted that the host computer 2402, the base station 2418, and the UE 2414 illustrated in FIG. 24 may be similar or identical to the host computer 2316, one of the base stations 2306A, 2306B, 2306C, and one of the UEs 2312, 2314 of FIG. 23, respectively. This is to say, the inner workings of these entities may be as shown in FIG. 24 and independently, the surrounding network topology may be that of FIG. 23.

In FIG. 24, the OTT connection 2416 has been drawn abstractly to illustrate the communication between the host computer 2402 and the UE 2414 via the base station 2418 without explicit reference to any intermediary devices and the precise routing of messages via these devices. The network infrastructure may determine the routing, which may be configured to hide from the UE 2414 or from the service provider operating the host computer 2402, or both. While the OTT connection 2416 is active, the network infrastructure may further take decisions by which it dynamically changes the routing (e.g., on the basis of load balancing consideration or reconfiguration of the network).

The wireless connection 2426 between the UE 2414 and the base station 2418 is in accordance with the teachings of the embodiments described throughout this disclosure. One or more of the various embodiments improve the performance of OTT services provided to the UE 2414 using the OTT connection 2416, in which the wireless connection 2426 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2416 between the host computer 2402 and the UE 2414, in response to variations in the measurement results. The measurement procedure and/or the network functionality for reconfiguring the OTT connection 2416 may be implemented in the software 2410 and the hardware 2404 of the host computer 2402 or in the software 2440 and the hardware 2434 of the UE 2414, or both. In some embodiments, sensors (not shown) may be deployed in or in association with communication devices through which the OTT connection 2416 passes; the sensors may participate in the measurement procedure by supplying values of the monitored quantities exemplified above, or supplying values of other physical quantities from which the software 2410, 2440 may compute or estimate the monitored quantities. The reconfiguring of the OTT connection 2416 may include message format, retransmission settings, preferred routing, etc.; the reconfiguring need not affect the base station 2418, and it may be unknown or imperceptible to the base station 2418. Such procedures and functionalities may be known and practiced in the art. In certain embodiments, measurements may involve proprietary UE signaling facilitating the host computer's 2402 measurements of throughput, propagation times, latency, and the like. The measurements may be implemented in that the software 2410 and 2440 causes messages to be transmitted, in particular empty or 'dummy' messages, using the OTT connection 2416 while it monitors propagation times, errors, etc.

FIG. 25 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 25 will be included in this section. In step 2500, the host computer provides user data. In sub-step 2502 (which may be optional) of step 2500, the host computer provides the user data by executing a host application. In step 2504, the host computer initiates a transmission carrying the user data to the UE. In step 2506 (which may be optional), the base station transmits to the UE the user data which was carried in the transmission that the host computer initiated, in accordance with the teachings of the embodiments described throughout this disclosure. In step 2508 (which may also be optional), the UE executes a client application associated with the host application executed by the host computer.

FIG. 26 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 26 will be included in this section. In step 2600 of the method, the host computer provides user data. In an optional sub-step (not shown) the host computer provides the user data by executing a host application. In step 2602, the host computer initiates a transmission carrying the user data to the UE. The transmission may pass via the base station, in accordance with the teachings of the embodiments described throughout this disclosure. In step 2604 (which may be optional), the UE receives the user data carried in the transmission.

Figures 27, 28:
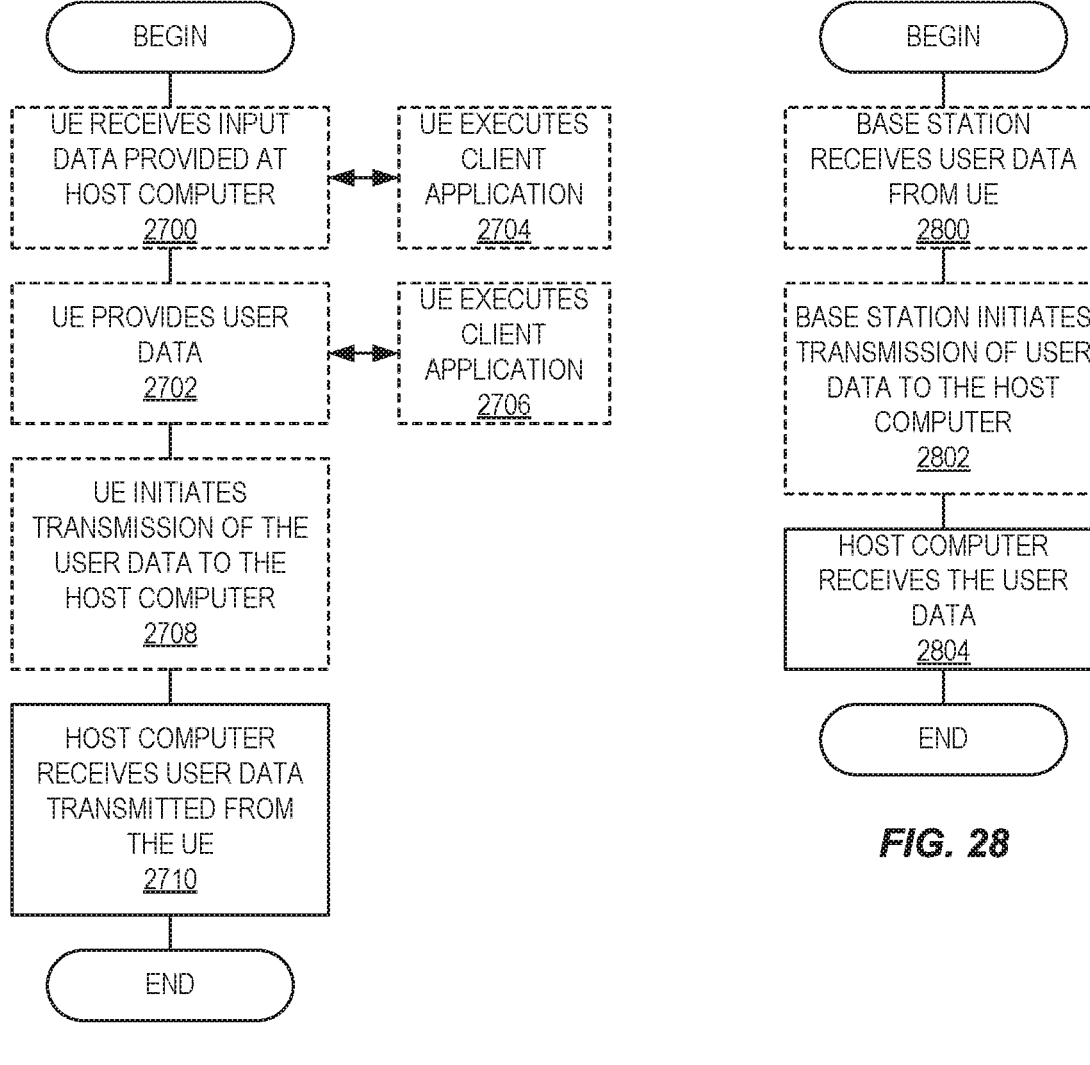
FIG. 27 is a flowchart illustrating a method implemented in a communication system in accordance with one embodiment of the present disclosure.
FIG. 28 is a flowchart illustrating a method implemented in a communication system in accordance with one embodiment of the present disclosure.

FIG. 27 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 27 will be included in this section. In step 2700 (which may be optional), the UE receives input data provided by the host computer. Additionally or alternatively, in step 2702, the UE provides user data. In sub-step 2704 (which may be optional) of step 2700, the UE provides the user data by executing a client application. In sub-step 2706 (which may be optional) of step 2702, the UE executes a client application which provides the user data in reaction to the received input data provided by the host computer. In providing the user data, the executed client application may further consider user input received from the user. Regardless of the specific manner in which the user data was provided, the UE initiates, in sub-step 2708 (which may be optional), transmission of the user data to the host computer. In step 2710 of the method, the host computer receives the user data transmitted from the UE, in accordance with the teachings of the embodiments described throughout this disclosure.

FIG. 28 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 28 will be included in this section. In step 2800 (which may be optional), in accordance with the teachings of the embodiments described throughout this disclosure, the base station receives user data from the UE. In step 2802 (which may be optional), the base station initiates transmission of the received user data to the host computer. In step 2804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BLER Block Error Rate
BWP
CP
CPU
CQI
CSI
CSI-IM
CSI-RS
Bandwidth Part
Cyclic Prefix
Central Processing Unit
Channel Quality Indication
Channel State Information
Channel State Information-Interference Measurement
Channel State Information-Reference Signal
DCI Downlink Channel Information DFT-S-OFDM Discrete Fourier Transform Spread OFDM
DL Downlink
DMRS Demodulation Reference Signal
DN Data Network
DSP Digital Signal Processor
eMBB enhanced Mobile Broadband
eNB Enhanced or Evolved Node B
=
FPGA Field Programmable Gate Array
gNB New Radio Base Station
gNB-DU New Radio Base Station Distributed Unit
HSS Home Subscriber Server
IE Information Element
IoT Internet of Things
IP Internet Protocol
LTE Long Term Evolution
MIMO Multiple Input Multiple Output
MME Mobility Management Entity
MTC Machine Type Communication
NEF Network Exposure Function
NF Network Function
NG-RAN Next Generation Radio Access Network
NR New Radio
NRF Network Function Repository Function
NSSF Network Slice Selection Function
NZP Non-Zero Power
OFDM Orthogonal Frequency Division Multiplexing
OTT Over-the-Top
PBCH Physical Broadcast Channel
PC Personal Computer
PCF Policy Control Function
PDCCH Physical Downlink Control Channel
PDSCH Physical Downlink Shared Channel
P-GW Packet Data Network Gateway
PMI Precoding Matrix Indicator
PRB Physical Resource Block
PUSCH Physical Uplink Shared Channel
RAM Random Access Memory
RAN Radio Access Network
RB Resource Block
RE Resource Element
RI Rank Indicator
ROM Read Only Memory
RRC Radio Resource Control
RRH Remote Radio Head
SCEF Service Capability Exposure Function
SINR Signal to Interference Plus Noise Ratio
SMF Session Management Function
SSB Synchronization Signal Block
TCI Transmission Configuration Indicator
TDD Time Division Duplexing
UDM Unified Data Management
UE User Equipment
UL Uplink
UPF User Plane Function
URLLC Ultra Reliable Low Latency Communication
ZP Zero Power Those skilled in the art will recognize improvements and modifications to the embodiments of the present disclosure. All such improvements and modifications are considered within the scope of the concepts disclosed herein.

The invention claimed is:

1. A method performed by a wireless device for reporting channel conditions, the method comprising:
   receiving a Channel State Information-Interference Measurement, CSI-IM, pattern, wherein the CSI-IM pattern comprises indication of CSI-IM resources occupying multiple symbols in a slot while not fully spanning the slot;

receiving an activation message indicating the CSI-IM pattern; and reporting the channel conditions based on the CSI-IM pattern;

wherein the CSI-IM pattern:
- (a) spans every other Orthogonal Frequency-Division Multiplexing, OFDM, symbols in a slot;
- (b) comprises Resource Elements, REs, in the single subcarrier and every K$^{th}$ OFDM symbol in the slot in each Physical Resource Block, PRB, of configured Channel State Information—Reference Signal, CSI-RS, bandwidth, where K indicates symbol density of CSI-IM REs; and/or
- (c) comprises the REs in the single subcarrier and multiple consecutive OFDM symbols in the slot in each PRB of the configured CSI-RS bandwidth.

2. The method of claim 1 wherein the CSI-IM pattern comprises one or more of the group consisting of:
a configurable starting symbol;
a configurable starting symbol and duration in symbols;
a configurable starting symbol and a fixed duration;
a configurable starting symbol and symbol density;
a configurable starting symbol and symbol density, and a fixed number of CSI-IM RES;
different CSI-IM patterns in different PRBs; and
CSI-IM repetition in multiple slots.

3. The method of claim 2 wherein the symbol density comprises the CSI-IM pattern in every K>1 symbol in the slot.

4. The method of claim 1 wherein receiving the CSI-IM pattern further comprises receiving rules for handling collisions when the CSI-IM pattern overlaps with other signals or channels.

5. The method of claim 4 further comprising:
assuming that CSI-IM REs overlapping with other reference signals or physical channels are not available for interference measurement.

6. The method of claim 1 wherein receiving the CSI-IM pattern further comprises receiving an indication of a Zero Power, ZP, CSI-RS resource having exactly the same REs as the CSI-IM, wherein the ZP CSI-RS is introduced for Physical Downlink Shared Channel, PDSCH, rate matching.

7. The method of claim 1 wherein the CSI-IM pattern is repeated in multiple slots for measuring and reporting Channel Quality Indication, CQI, variation due to interference variation.

8. The method of claim 7 wherein the CQI variation comprises one or more of the group consisting of: a mean; a standard deviation; a variance; a minimum; and a percentile value of CQIs.

9. The method of claim 1 wherein the CSI is an aperiodic CSI.

10. A method performed by a base station for receiving channel conditions, the method comprising:
transmitting, to a wireless device, a Channel State Information-Interference Measurement, CSI-IM, pattern, wherein the CSI-IM pattern comprises indication of CSI-IM resources occupying multiple symbols in a slot while not fully spanning the slot;
sending an activation message indicating the CSI-IM pattern; and
receiving, from the wireless device, a channel conditions report based on the CSI-IM pattern;

28 wherein the CSI-IM pattern:
- (a) spans every other Orthogonal Frequency-Division Multiplexing, OFDM, symbols in a slot;
- (b) comprises Resource Elements, REs, in the single subcarrier and every K$^{th}$ OFDM symbol in the slot in each Physical Resource Block, PRB, of configured Channel State Information-Reference Signal, CSI-RS, bandwidth, where K indicates symbol density of CSI-IM REs; and/or
- (c) comprises the REs in the single subcarrier and multiple consecutive OFDM symbols in the slot in each PRB of the configured CSI-RS bandwidth.

11. The method of claim 10 wherein the CSI-IM pattern comprises one or more of the group consisting of:
a configurable starting symbol;
a configurable starting symbol and duration in symbols;
a configurable starting symbol and a fixed duration;
a configurable starting symbol and symbol density;
a configurable starting symbol and symbol density, and a fixed number of CSI-IM RES;
different CSI-IM patterns in different PRBs; and
CSI-IM repetition in multiple slots.

12. The method of claim 11 wherein the symbol density comprises the CSI-IM pattern in every K>1 symbol in the slot.

13. A wireless device for reporting channel conditions, the wireless device comprising:
one or more processors; and
memory storing instructions executable by the one or more processors, whereby the wireless device is operable to perform the steps of:
receiving a Channel State Information-Interference Measurement, CSI-IM, pattern, wherein the CSI-IM pattern comprises indication of CSI-IM resources occupying multiple symbols in a slot while not fully spanning the slot;
receiving an activation message indicating the CSI-IM pattern; and
reporting the channel conditions based on the CSI-IM pattern;
wherein the CSI-IM pattern:
- (a) spans every other Orthogonal Frequency-Division Multiplexing, OFDM, symbols in a slot;
- (b) comprises Resource Elements, REs, in the single subcarrier and every Kt OFDM symbol in the slot in each Physical Resource Block, PRB, of configured Channel State Information-Reference Signal, CSI-RS, bandwidth, where K indicates symbol density of CSI-IM REs; and/or
- (c) comprises the REs in the single subcarrier and multiple consecutive OFDM symbols in the slot in each PRB of the configured CSI-RS bandwidth.

14. A base station for receiving channel conditions, the base station comprising:
one or more processors; and
memory comprising instructions to cause the base station to perform the steps of:
transmitting, to a wireless device, a Channel State Information-Interference Measurement, CSI-IM, pattern, wherein the CSI-IM pattern comprises indication of CSI-IM resources occupying multiple symbols in a slot while not fully spanning the slot;
send an activation message indicating the CSI-IM pattern; and
receive, from the wireless device, a channel conditions report based on the CSI-IM pattern;

wherein the CSI-IM pattern:

(a) spans every other Orthogonal Frequency-Division Multiplexing, OFDM, symbols in a slot;

(b) comprises Resource Elements, REs, in the single subcarrier and every $K^{th}$ OFDM symbol in the slot in each Physical Resource Block, PRB, of configured Channel State Information-Reference Signal, CSI-RS, bandwidth, where K indicates symbol density of CSI-IM REs; and/or (c) comprises the REs in the single subcarrier and multiple consecutive OFDM symbols in the slot in each PRB of the configured CSI-RS bandwidth.

* * * * *